(12) United States Patent
Lambert et al.

(10) Patent No.: US 10,746,557 B1
(45) Date of Patent: Aug. 18, 2020

(54) SYSTEMS AND METHODS FOR NAVIGATION USING BOUNDING AREAS

(71) Applicant: Lyft, Inc., San Francisco, CA (US)

(72) Inventors: Michel Lambert, New York, NY (US); Roy Evans Williams, III, Englewood Cliffs, NJ (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/448,668

(22) Filed: Jun. 21, 2019

(51) Int. Cl.
*G01C 21/34* (2006.01)

(52) U.S. Cl.
CPC ................. *G01C 21/3446* (2013.01)

(58) Field of Classification Search
CPC .................................. G01C 21/3446
See application file for complete search history.

(56) References Cited

U.S. PATENT DOCUMENTS

| 6,076,041 | A | * | 6/2000 | Watanabe | G01C 21/3644 |
| | | | | | 701/437 |
| 9,418,672 | B2 | * | 8/2016 | Pylappan | H04L 5/00 |
| 10,037,029 | B1 | * | 7/2018 | Russell | G05D 1/0212 |
| 2006/0099959 | A1 | * | 5/2006 | Staton | B60R 25/33 |
| | | | | | 455/456.1 |
| 2007/0078599 | A1 | * | 4/2007 | Yoshioka | G01C 21/367 |
| | | | | | 701/454 |
| 2007/0100545 | A1 | * | 5/2007 | Morita | G01C 21/3632 |
| | | | | | 701/437 |
| 2010/0256900 | A1 | * | 10/2010 | Yamaguchi | G01C 21/36 |
| | | | | | 701/533 |
| 2011/0054783 | A1 | * | 3/2011 | Kishikawa | G01C 21/3632 |
| | | | | | 701/533 |
| 2011/0112760 | A1 | * | 5/2011 | Serbanescu | G01C 21/32 |
| | | | | | 701/465 |
| 2011/0301837 | A1 | * | 12/2011 | Wellmann | G01C 21/3446 |
| | | | | | 701/410 |
| 2015/0198456 | A1 | * | 7/2015 | Ishikawa | G01C 21/3632 |
| | | | | | 701/437 |
| 2016/0258764 | A1 | * | 9/2016 | Phuyal | G01C 21/26 |
| 2016/0290814 | A1 | * | 10/2016 | Heed | H04W 4/021 |
| 2017/0154531 | A1 | * | 6/2017 | Funabashi | G01C 21/30 |
| 2017/0316702 | A1 | * | 11/2017 | Pouillard | G05D 1/0044 |
| 2018/0066957 | A1 | * | 3/2018 | Stroila | G08G 1/0112 |
| 2018/0208199 | A1 | * | 7/2018 | Fujita | G08G 1/00 |

* cited by examiner

*Primary Examiner* — Courtney D Heinle
(74) *Attorney, Agent, or Firm* — Haynes and Boone, LLP

(57) ABSTRACT

The disclosed computer-implemented method may include determining a route with at least one waypoint for a personal mobility vehicle, determining at least one navigational boundary, and providing the at least one navigational boundary and the at least one waypoint to a computing device associated with the personal mobility vehicle, wherein the computing device is configured to provide a direction of travel to a user for navigating the personal mobility vehicle along the route via the waypoint. Various other methods, systems, and computer-readable media are also disclosed.

20 Claims, 16 Drawing Sheets

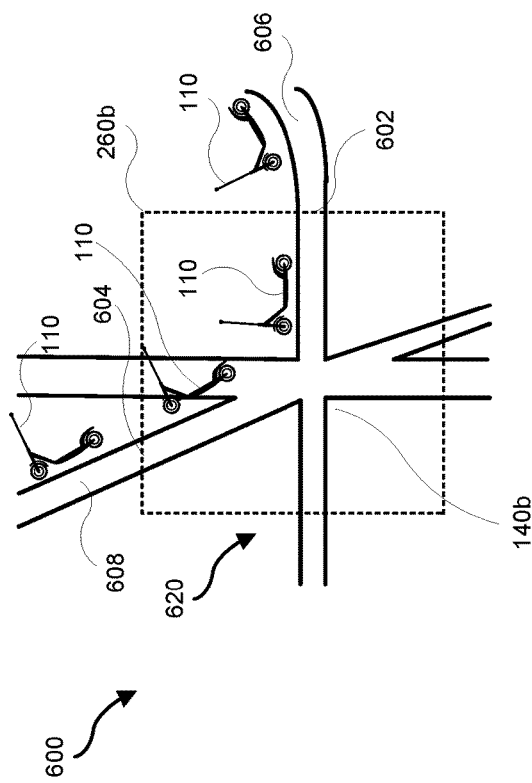
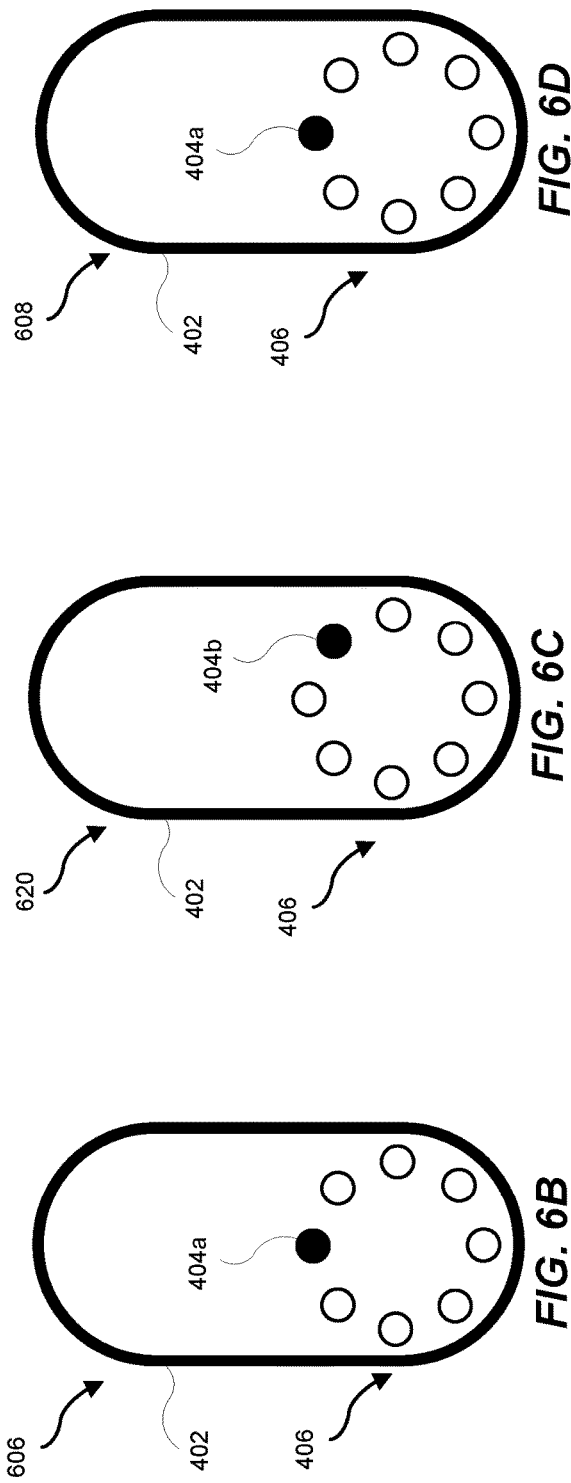

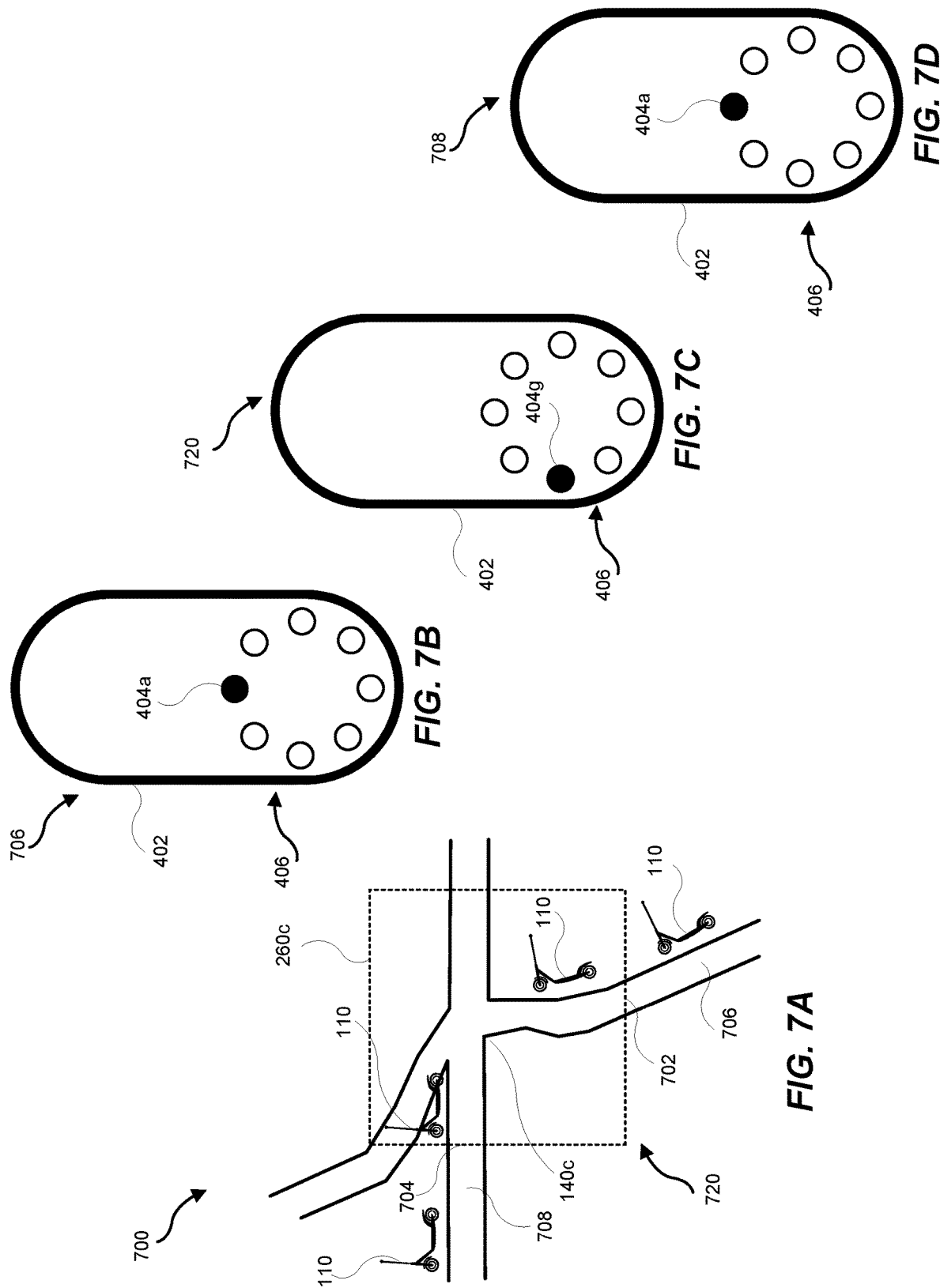

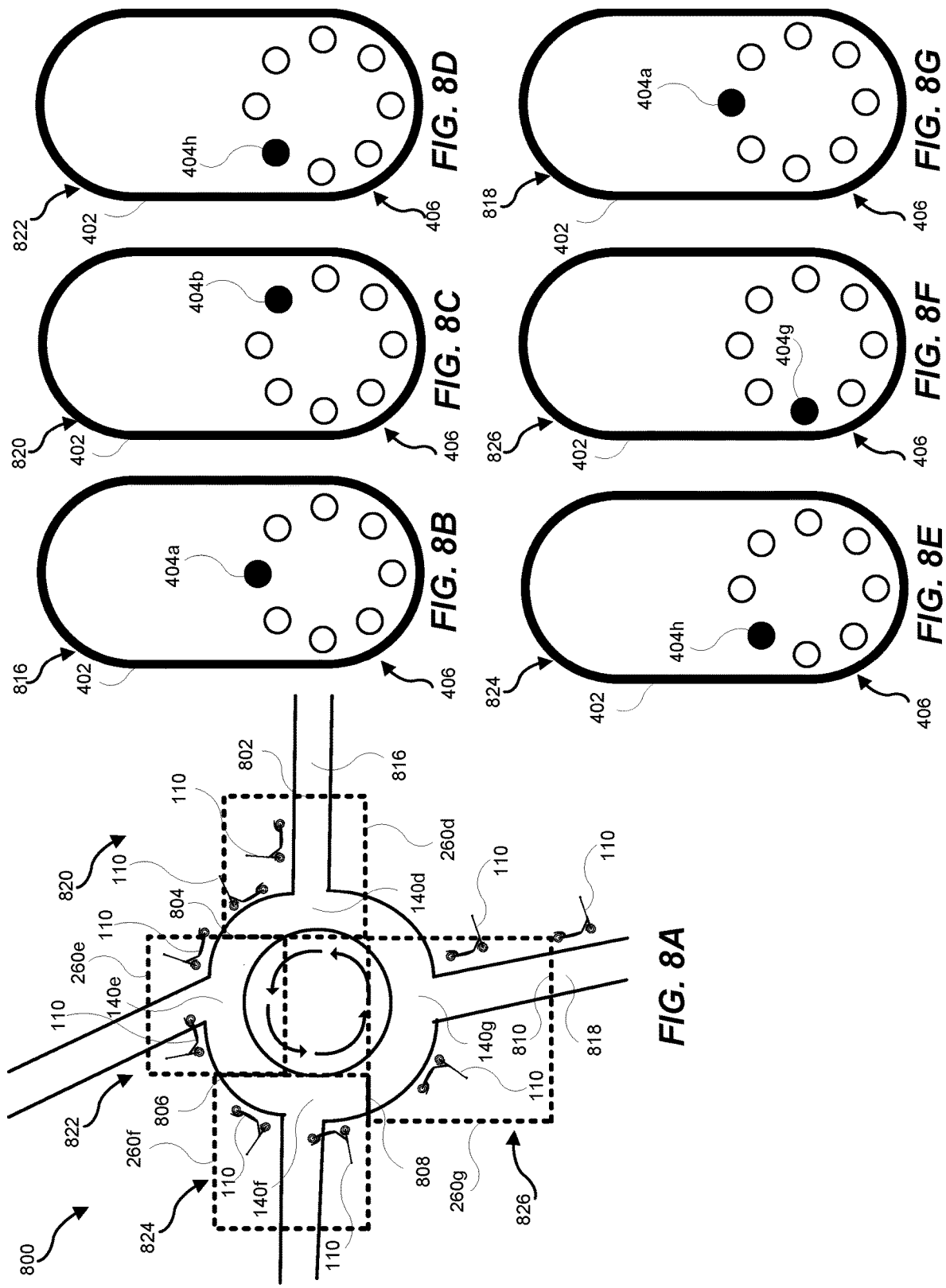

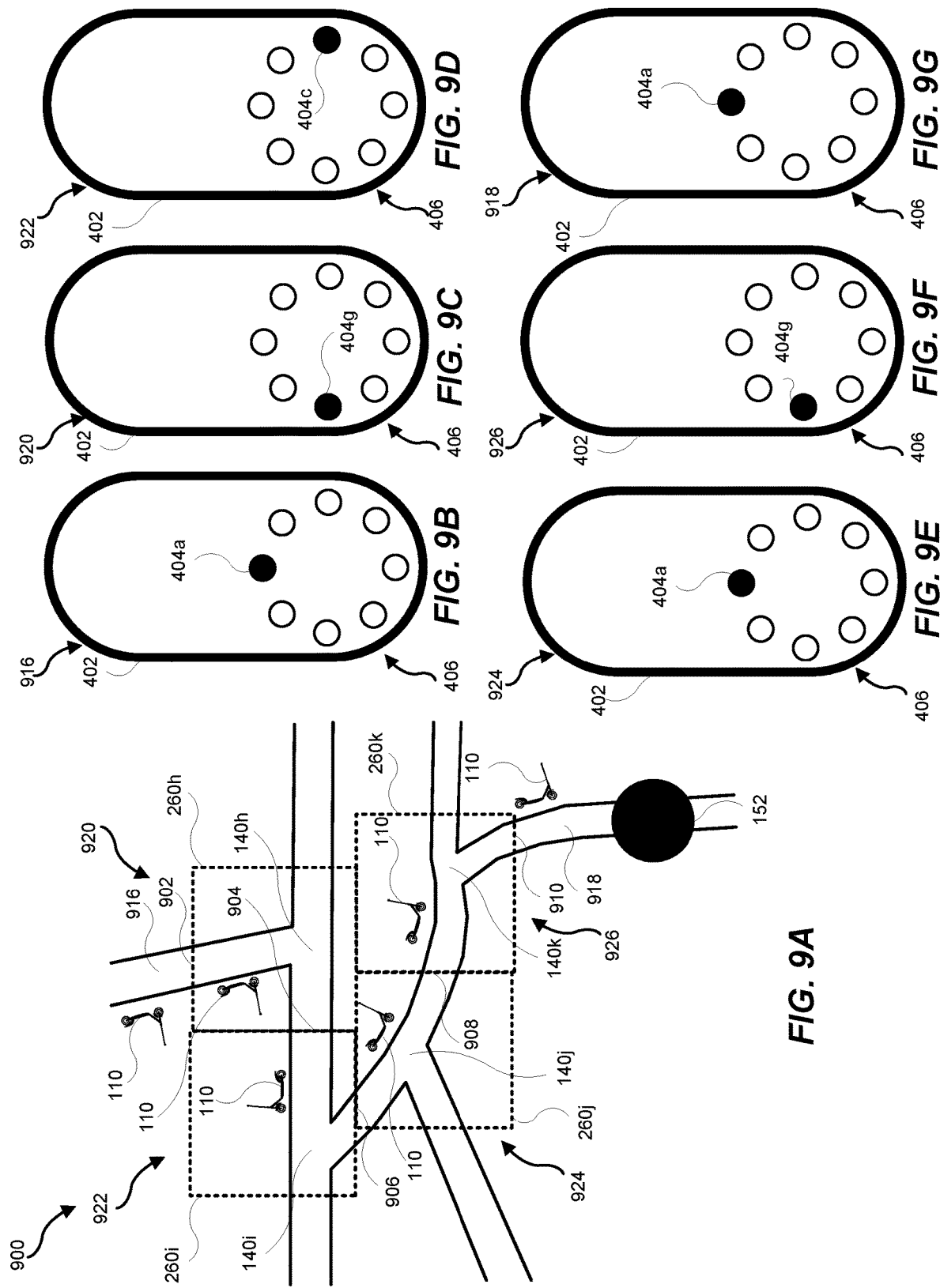

SYSTEMS AND METHODS FOR NAVIGATION USING BOUNDING AREAS

BACKGROUND

A dynamic transportation network that provides on-demand transportation to transportation requestors may include and use personal mobility vehicles for fulfilling transportation requests. A transportation requestor may meet up with a personal mobility vehicle (e.g., a scooter) and ride the personal mobility vehicle along a route from a starting location to an ending location (a destination). The transportation requestor may navigate the personal mobility vehicle along the route. Providing relevant and easily interpreted directional information for use by the transportation requestor while riding the personal mobility vehicle can be challenging. For example, the transportation requestor should focus on safely riding the personal mobility vehicle along the route. In order to do so, however, the transportation requestor may need to stop travel on the personal mobility vehicle to determine if they are following the correct route to the destination. The transportation requestor may need to refer to a map or other type of navigation aide that may be included, for example, on a mobile device of the transportation requestor. A transportation requestor may need to stop and refer to the map multiple times during travel along the route. This may prove frustrating to the transportation requestor as well as increasing the travel time for the route.

SUMMARY

As will be described in greater detail below, the instant disclosure describes providing relative headings to an indicator included on a personal mobility vehicle as a rider navigates the personal mobility vehicle from a starting to an ending location.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6A is an illustration of an example second trip segment using a personal mobility vehicle for transport to and through a second bounding area.

FIGS. 6B-D are illustrations of light-emitting devices in a configuration for use as a directional indicator, providing directional information for travel along a route in the example second trip segment as shown in FIG. 6A.

FIG. 7A is an illustration of an example third trip segment using a personal mobility vehicle for transport to and through a third bounding area.

FIGS. 7B-D are illustrations of light-emitting devices in a configuration for use as a directional indicator, providing directional information for travel along a route in the example third trip segment as shown in FIG. 7A.

FIG. 8A is an illustration of an example fourth trip segment using a personal mobility vehicle for transport through consecutive bounding areas.

FIGS. 8B-G are illustrations of the light-emitting devices in a configuration for use as a directional indicator, providing directional information for travel along a route in the example fourth trip segment as shown in FIG. 8A.

FIG. 9A is an illustration of an example fifth trip segment using a personal mobility vehicle for transport through consecutive bounding areas.

FIGS. 9B-G are illustrations of the light-emitting devices in a configuration for use as a directional indicator, providing directional information for travel along a route in the example fifth trip segment as shown in FIG. 9A.

Figure 1:
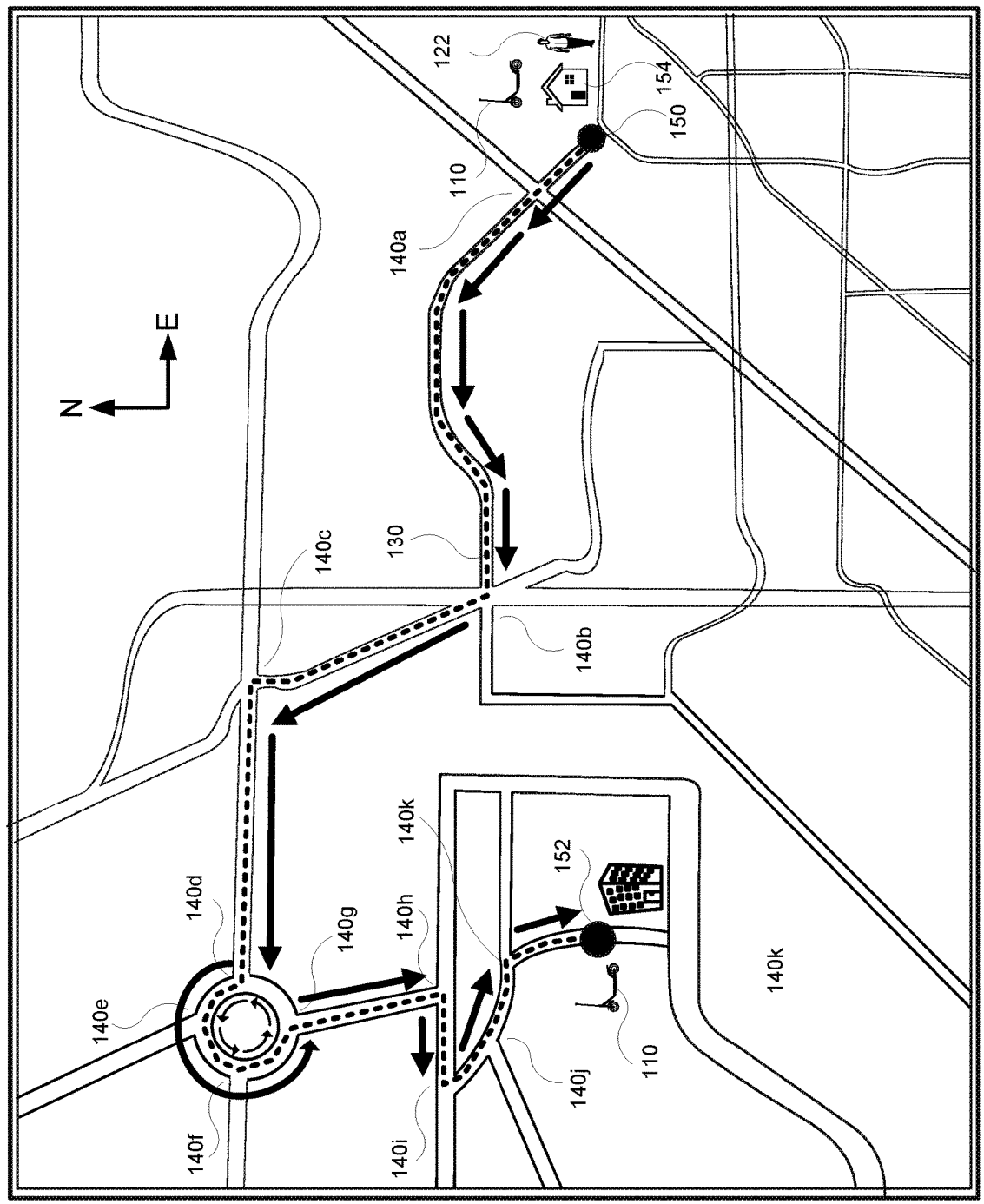
FIG. 1 is an illustration of an example trip using a personal mobility vehicle for transport from a starting location to an ending location.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing navigational information for use by a transportation requestor (e.g., a rider or user) while riding (utilizing) a personal mobility vehicle (e.g., a scooter or bicycle) along a route of travel from a starting location to an ending location or destination. As will be explained in greater detail below, embodiments of the instant disclosure may instead of (or in addition to) providing turn-by-turn directions for navigation from the starting location to the ending location, may provide an indication of an immediate heading toward which a rider should travel along a route while utilizing the personal mobility vehicle.

Systems that provide turn-by-turn directions for navigation may be challenged when providing directional information for navigation of a personal mobility vehicle. For example, as discussed herein, many intersections or locations where a direction of travel may change may not involve a turn for the personal mobility vehicle but may involve navigating the personal mobility vehicle through a traffic circle, a more than four-way intersection, one or more road ramps, etc. where a direction of travel may be more than just a turn. The use of systems and methods that provide navigational information to a requestor that includes indications of immediate headings towards which the requestor should travel while riding a personal mobility vehicle may be a more accurate and easier way to navigate the personal mobility vehicle from the starting location to the ending location.

For example, a navigation system of a dynamic transportation matching system may provide a series of waypoints toward which the personal mobility vehicle should travel to (and in some cases through) along a route of travel from the starting location towards the ending location to successfully reach the destination. Each waypoint may be an intermediate location along the route at which a direction of the travel along the route may change course. For example, a waypoint may be at a curve in a road, a turn in a road, an intersection, a fork in a road, an entrance ramp, an exit ramp, or a U-turn.

The navigation system of the dynamic transportation matching system may define one or more navigational features. A navigational feature may also be referred to herein as a navigational threshold, a navigational boundary, a bounding area, or a bounding box. The one or more navigational features may be defined to aid in the navigating of a personal mobility vehicle from a starting location to an ending or destination location. A navigational feature may define an area, a particular location, or a point that includes or identifies an intermediate location along a route of the travel of a personal mobility vehicle from the starting location to the ending location. For example, the intermediate location may be considered a waypoint as described herein. In some cases, the intermediate location may be a location along the route at which a direction of the travel along the route may change course. In some cases, the intermediate location may be a location along the route at which a direction of the travel along the route may continue along a same course but where may alternate directions of travel could be followed. In some implementations, a navigational feature may be a line or point that identifies (represents) the location.

The navigation system of the dynamic transportation matching system may define a bounding area (which may also be referred to herein as a bounding box) that surrounds (encompasses or includes) a waypoint. The bounding area may include an ingress point indicating an entry point of the personal mobility vehicle on a route of travel (e.g., a road) included in the bounding area that is on the route of travel towards the waypoint. The bounding area may include one or more egress points indicating respective one or more exit points out of the bounding area. The bounding area may also include heading information indicating a direction of travel for the personal mobility vehicle directed towards a destination that may direct travel for the personal mobility vehicle towards a specific egress point included in the bounding area. The specific egress point included in the bounding area may be referred to as a waypoint of the bounding area. A waypoint of a bounding area may be a specific egress point included in the bounding area towards which travel of the personal mobility vehicle is directed towards to navigate the personal mobility vehicle along a route of travel from a starting location to an ending or destination location.

A computing device included on the personal mobility vehicle (e.g., mounted on the personal mobility vehicle) may include an indicator that may provide a visual indication to a rider of the personal mobility vehicle of a direction of travel. For example, a dynamic transportation matching system may communicate with the computing device. The navigation system of the dynamic transportation matching system may define one or more bounding areas that the dynamic transportation matching system may provide to the computing device included on the personal mobility vehicle. In some implementations, the navigation system may define the one or more bounding areas around navigational junctures (e.g., intersections, forks, roundabouts, entrance ramps, exit ramps, etc.), that may include one or more egress points at the start of and/or towards a road or route of possible travel of the personal mobility vehicle while located within the area defined by the bounding area. The navigation system may identify a specific egress point included in the one or more egress points within a bounding area down and/or towards which the personal mobility vehicle should travel to remain along a route of travel towards the destination point. When the route of travel of the personal mobility vehicle enters a bounding area, the indicator may display heading information directed to the identified egress point (e.g., a waypoint of the bounding area) within the bounding area towards which the personal mobility vehicle should travel to within the bounding area.

In some implementations, the navigation system may select bounding areas and egress points with sufficient granularity that traveling toward the indicated heading by the personal mobility vehicle will enable the personal mobility vehicle to reach the egress point. For example, the navigation system may provide sufficient bounding areas such that travel of the personal mobility vehicle from the starting location to the destination location may be completed. For example, the navigation system may provide a bounding area for each identified waypoint along a route of travel. Each bounding area may use at least one geolocation coordinate to define the bounding area. In some implementations, the dynamic transportation matching system may be in communication with the computing device included on the personal mobility vehicle for the entire duration of travel from the starting location to the destination location. As such, the dynamic transportation matching system may provide each bounding area generated by the navigation system to the personal mobility vehicle in sufficient time to allow a computing device included on the personal mobility vehicle, and specifically an indicator included on the personal mobility vehicle, to provide a visual indication to a rider of the personal mobility vehicle of a direction of travel within the bounding area.

In some implementations, the navigation system may generate a bounding area for each waypoint along a travel route prior to the start of travel by the personal mobility vehicle. The dynamic transportation matching system may then provide the computing device included on the personal mobility vehicle with the bounding area for each waypoint along the travel route prior to the start of travel by the personal mobility vehicle. In these implementations, the navigation system may not need to generate bounding areas within a travel time constraint of the personal mobility vehicle. In these implementations, the dynamic transportation matching system may not need to be in communication with the computing device included on the personal mobility vehicle for the entire duration of travel from the starting location to the destination location to provide navigational information to the personal mobility vehicle. For example, the computing device may include memory for storage of each bounding area received prior to the start of travel by the personal mobility vehicle.

As the personal mobility vehicle travels along the travel route from the starting point towards the destination point, one or more navigational direction devices and/or systems (e.g., Global Positioning System (GPS), geolocational system, compass, etc.) may identify a geolocation of the personal mobility vehicle. Based on the identified geolocational information for the personal mobility vehicle, the computing device included on the personal mobility vehicle may determine if a bounding area is identified/defined within a travel time for the personal mobility vehicle. For example, based on a calculated travel speed of the personal mobility vehicle and/or a predetermined amount of time needed for a rider to glance at/look at an indicator and respond to an indicated direction of travel, the computing device can determine that the personal mobility vehicle is approaching/entering a bounding area. The indicator included in the computing device may then provide a visual indication to a rider of the personal mobility vehicle of a direction of travel within the bounding area. For example, the indicator may be a ring of light-emitting devices that may indicate a current heading (a direction of travel within a bounding area) to a rider of the personal mobility vehicle.

FIG. 1 is an illustration of an example trip 100 using a personal mobility vehicle for transport from a starting location 150 to an ending location 152 (which may also be referred to as a destination location or a destination). A requestor 122 (which also may be referred to herein as a transportation requestor) may request transportation using a personal mobility vehicle (e.g., personal mobility vehicle 110 (shown for example as a scooter)) from the starting location 150 to the ending location 152. In some implementations, the requestor 122 may travel to (e.g., walk to, be dropped off at, use other transportation to get to) the starting location 150 that includes at least one personal mobility vehicle that may be used by the requestor 122 for transport from the starting location 150 to the ending location 152. In some implementations, the starting location 150 that includes a personal mobility vehicle available for use by the requestor 122 may be located proximate to (e.g., within a short walking distance of) a current location of the requestor 122 (e.g., transportation requestor home 154). In some implementations, the starting location 150 that includes a personal mobility vehicle available for use by the requestor 122 may be located at a current location of the requestor 122.

A dynamic transportation matching system may match the requestor 122 to the personal mobility vehicle 110 for the trip 100 along a route 130. In some cases, the requestor 122 may use a computing device to locate, reserve, pay, and be matched with a personal mobility vehicle for travel from the starting location 150 to the ending location 152.

The requestor 122 may need directions to navigate the personal mobility vehicle 110 from the starting location 150 to the ending location 152 to travel along the route 130. In particular, directions may be beneficial as the personal mobility vehicle 110 travels towards and through navigational junctions (e.g., junctions 140a-h) along the route 130. A navigational junction (which may also be referred to herein as a junction, juncture, or a navigational juncture) may include, but is not limited to, an intersection (e.g., a meeting or joining of two or more roads), a fork (e.g., a junction where one road diverges into two or more roads), a roundabout or traffic circle (e.g., a road moves around a central spot to reach one or more roads that converge with the road), entrance ramps, exit ramps, or a U-turn.

In some cases, the requestor 122 while riding the personal mobility vehicle 110 may need to stop and look at a map to determine a direction of travel through a junction along the route 130. For example, the map may be displayed by a mapping application executing on a mobile device of the user. The mapping application may help the requestor 122 navigate along the route 130 from the starting location 150 to the ending location 152. Having to stop multiple times along the route 130 to safely and successfully navigate the personal mobility vehicle 110 from the starting location 150 to the ending location 152 may prove frustrating to the requestor 122. In addition, the stopping and starting of travel along the route 130 may increase a total travel time for the route 130.

Figure 2:
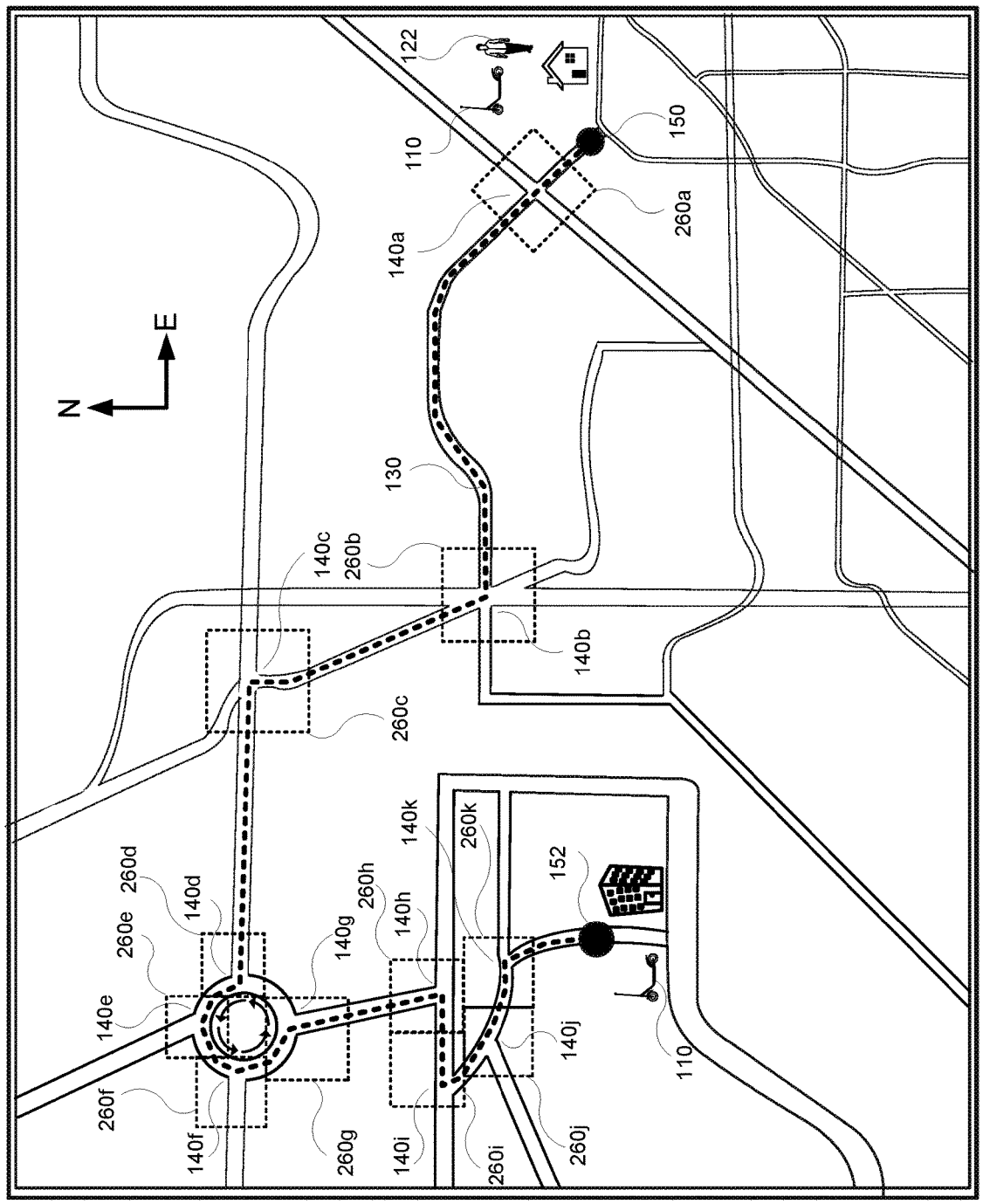
FIG. 2 is an illustration of an example trip using a personal mobility vehicle for transport from a starting location to an ending location that includes one or more bounding areas.

FIG. 2 is an illustration of an example trip 200 using a personal mobility vehicle (e.g., the personal mobility vehicle 110) for transport from the starting location 150 to the ending location 152 that includes one or more bounding areas (e.g., bounding areas 260a-k). In some implementations, the bounding areas 260a-k may be generated by a navigation system as described, for example, referring to FIG. 11 and FIG. 12. Each bounding area 260a-k may encompass (include, surround) a junction 140a-k, respectively, along the route 130.

For example, a bounding area may include a waypoint or egress point and an ingress or entry point. For example, the ingress point, and the waypoint may be reference points in physical space. A personal mobility vehicle may travel from the ingress point to the waypoint as the personal mobility vehicle travels along a route. The bounding area may encompass multiple directions of possible travel from the ingress point. The waypoint may identify a destination location for the travel of the personal mobility vehicle from the ingress point maintaining the travel of the personal mobility vehicle along the route. Examples of travel from an ingress point to a waypoint for each of the bounding areas 260*a-k* will be described herein with reference to FIGS. 5A-9A.

A bounding area may be generated for each navigational junction along a route. For example, a navigation system may identify junctions 140*a-k* along the route 130. The navigation system may identify the junctions 140*a-k* because each of the junctions 140*a-k* are geographical (location) points along the route 130 where the requestor 122, navigating the personal mobility vehicle 110 along the route 130, decides how to proceed by selecting a road, path, or direction of travel from among two or more available roads, paths, or directions of travel. As such, providing directional information to the personal mobility vehicle 110 for use in aiding the navigation of the personal mobility vehicle 110 by the requestor 122 may be desirable.

A bounding area may be of any geometric shape (e.g., a square, a rectangle, an oval, a circle, a triangle, a quadrangle, etc.). A bounding area may be defined by geolocation information and/or data (e.g., latitude and longitudinal coordinates). A bounding area may be defined by geolocation data and may be of a particular size (e.g., a number of square feet, a number of square meters, etc.). In some implementations, a size of the bounding area may, in addition or alternatively, be defined by a travel speed of the personal mobility vehicle. A personal mobility vehicle may travel at, for example, eight miles per hour (mph), ten mph, or twelve mph.

Figure 3:
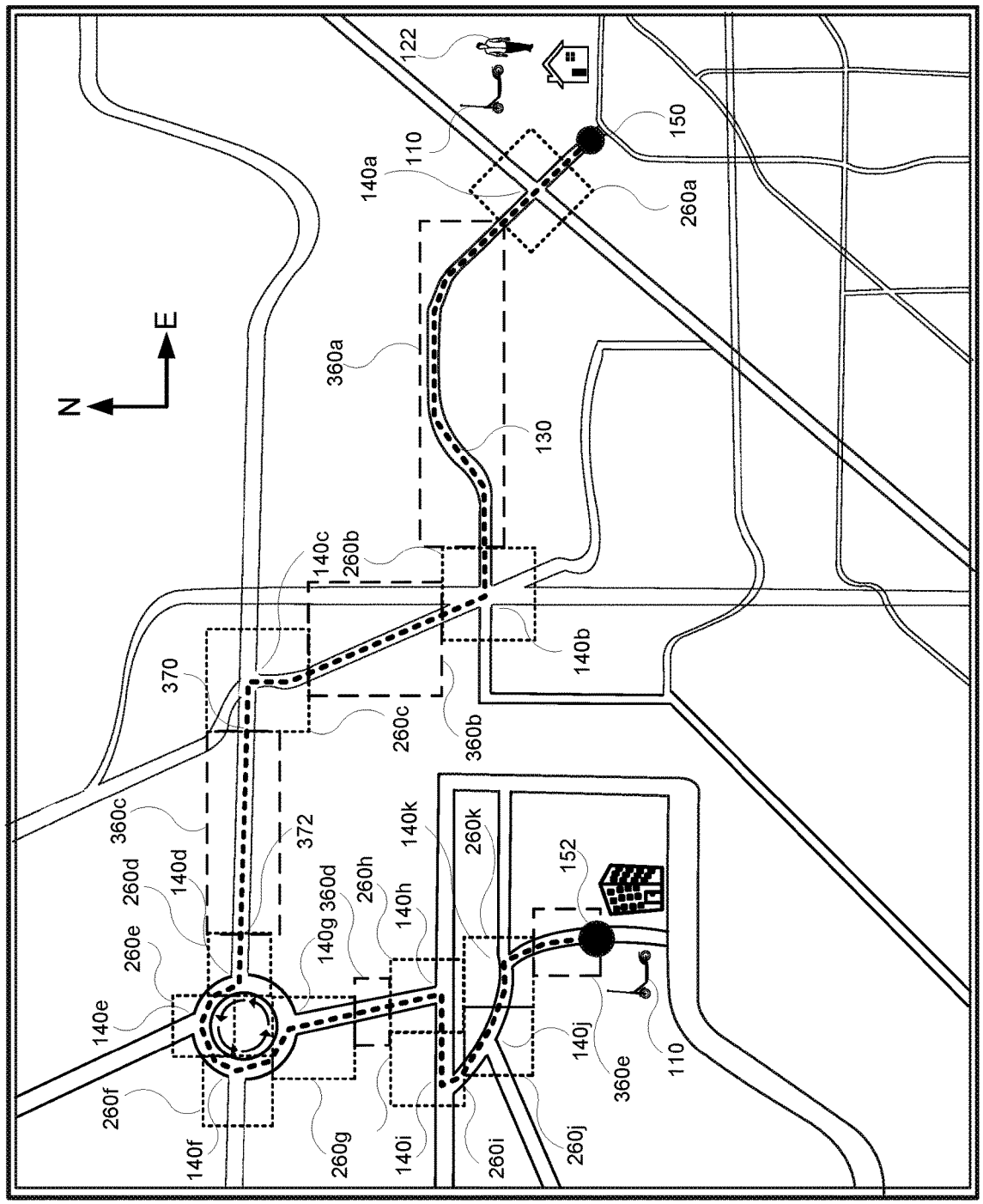
FIG. 3 is an illustration of an example trip using a personal mobility vehicle for transport from a starting location to an ending location that includes additional bounding areas.

FIG. 3 is an illustration of an example trip 300 using a personal mobility vehicle (e.g., the personal mobility vehicle 110) for transport from the starting location 150 to the ending location 152 that includes additional bounding areas 360*a-e*.

Figure 11:
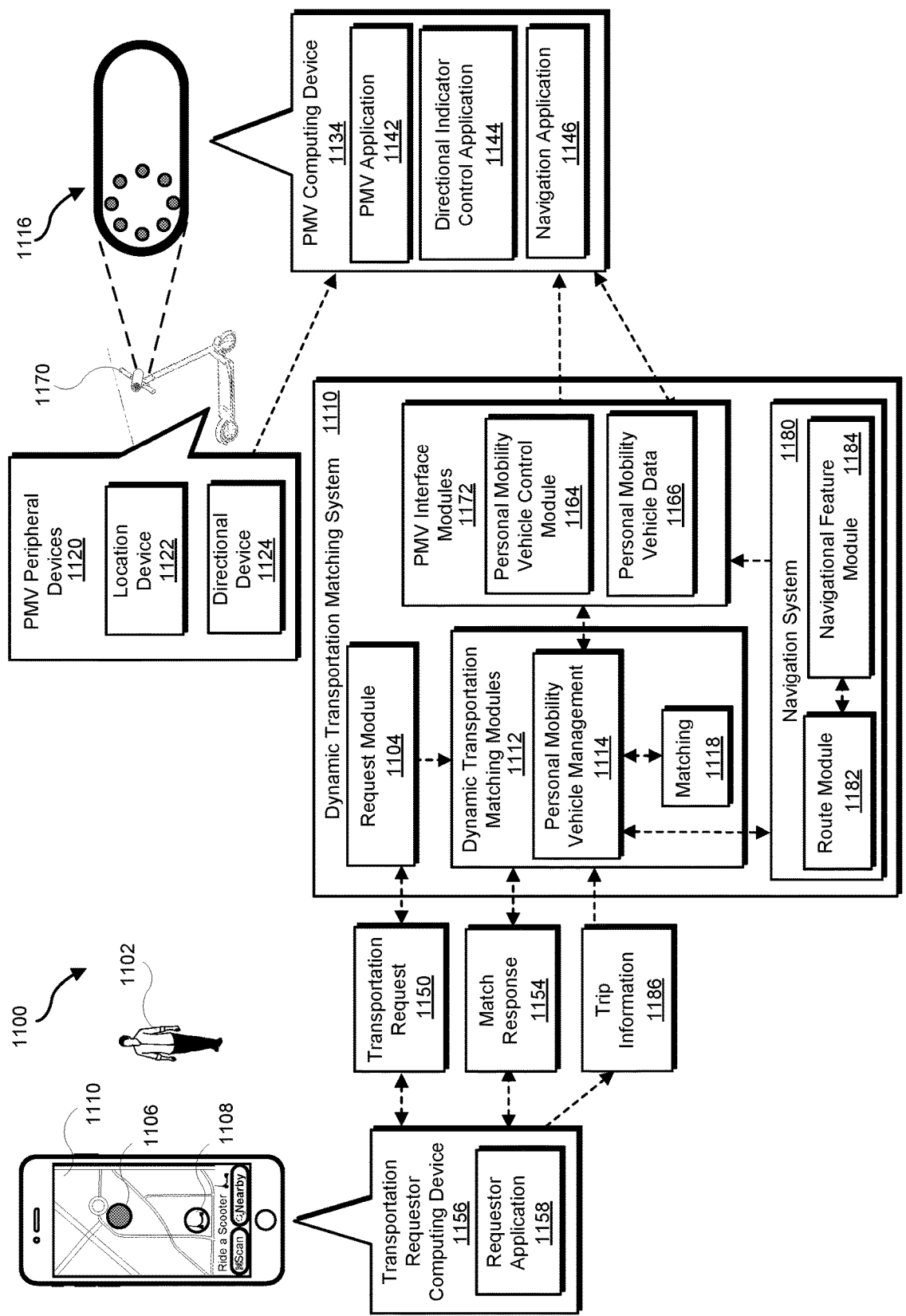
FIG. 11 is a block diagram of an example system for matching transportation requests with a dynamic transportation network that includes the use of bounding areas to provide navigation information and data to personal mobility vehicles with mounted computing devices that include light-emitting devices that provide directional information based on the navigation information and data included in the bounding areas.
Figure 12:
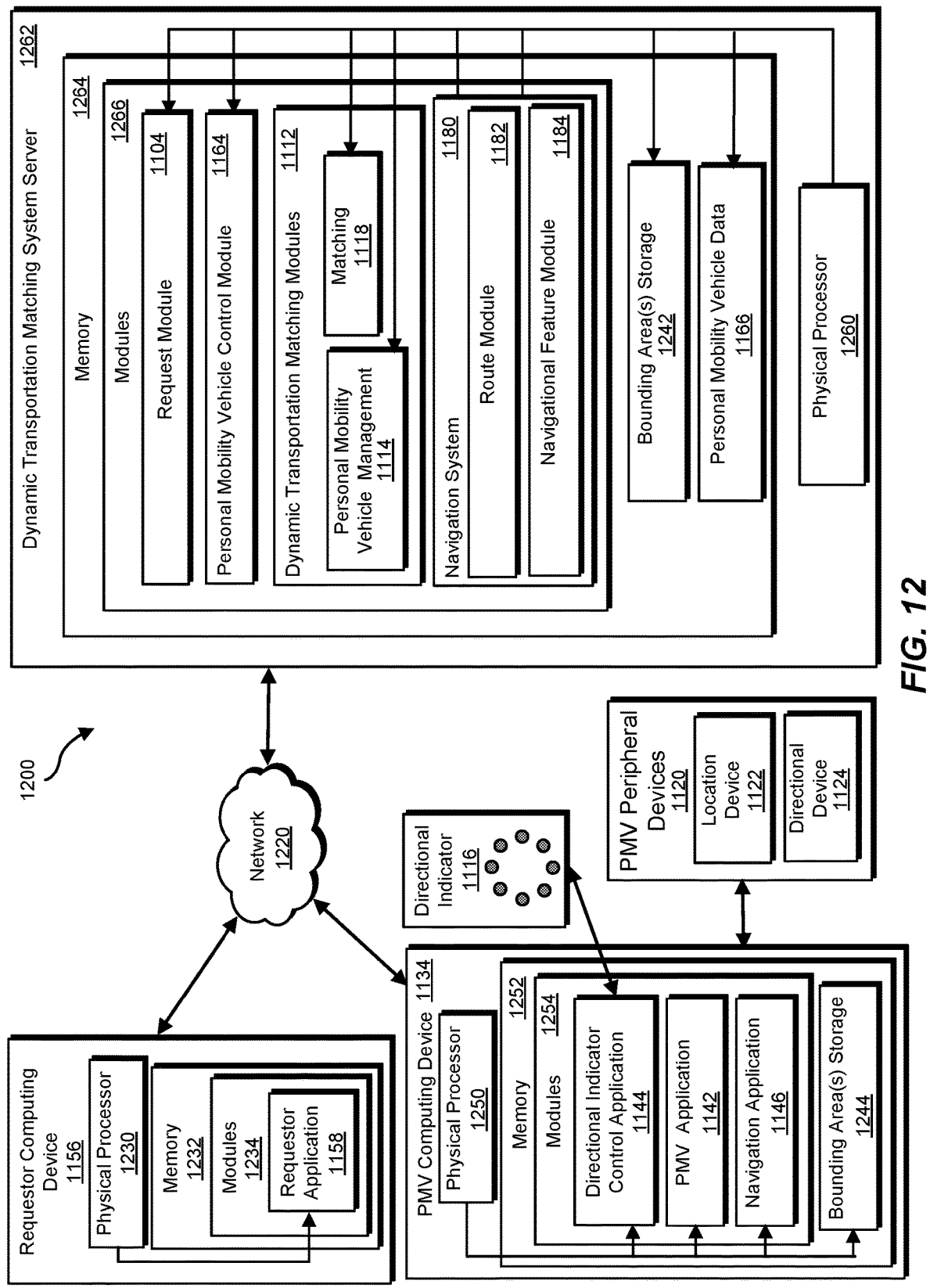
FIG. 12 is a block diagram of an example transportation matching system that utilizes and controls personal mobility vehicles with mounted computing devices that include light-emitting devices that provide directional information based on navigation information and data included in bounding areas.

In some implementations, one or more bounding areas (e.g., the bounding areas 360*a-g*) may be generated by a navigation system as described, for example, referring to FIG. 11 and FIG. 12. Each bounding area 360*a-e* may encompass (include, surround) an area of continued travel along the route 130 that may not include a junction. In the example shown in FIG. 3, the bounding areas 360*a-e* and the bounding areas 260*a-k* provide continual, consecutive bounding areas for the route 130 from the starting location 150 to the ending location 152.

In some implementations, the bounding areas 360*a-e* may be generated of a particular size based on a distance between a waypoint of a previous bounding area and an ingress point of a next bounding area. For example, referring to bounding area 360*e*, a size of the bounding area 360*e* may be determined based on a waypoint 370 of the bounding area 260*c* and an ingress point 372 of the bounding area 260*d*. The size of the bounding area 360*e* may provide continual directional information between the bounding area 260*c* and the bounding area 360*d*. For example, the waypoint 370 of the bounding area 260*c* may be the ingress point of the bounding area 360*e*. The ingress point 372 of the bounding area 260*d* may be the waypoint of the bounding area 360*e*.

Figure 4:
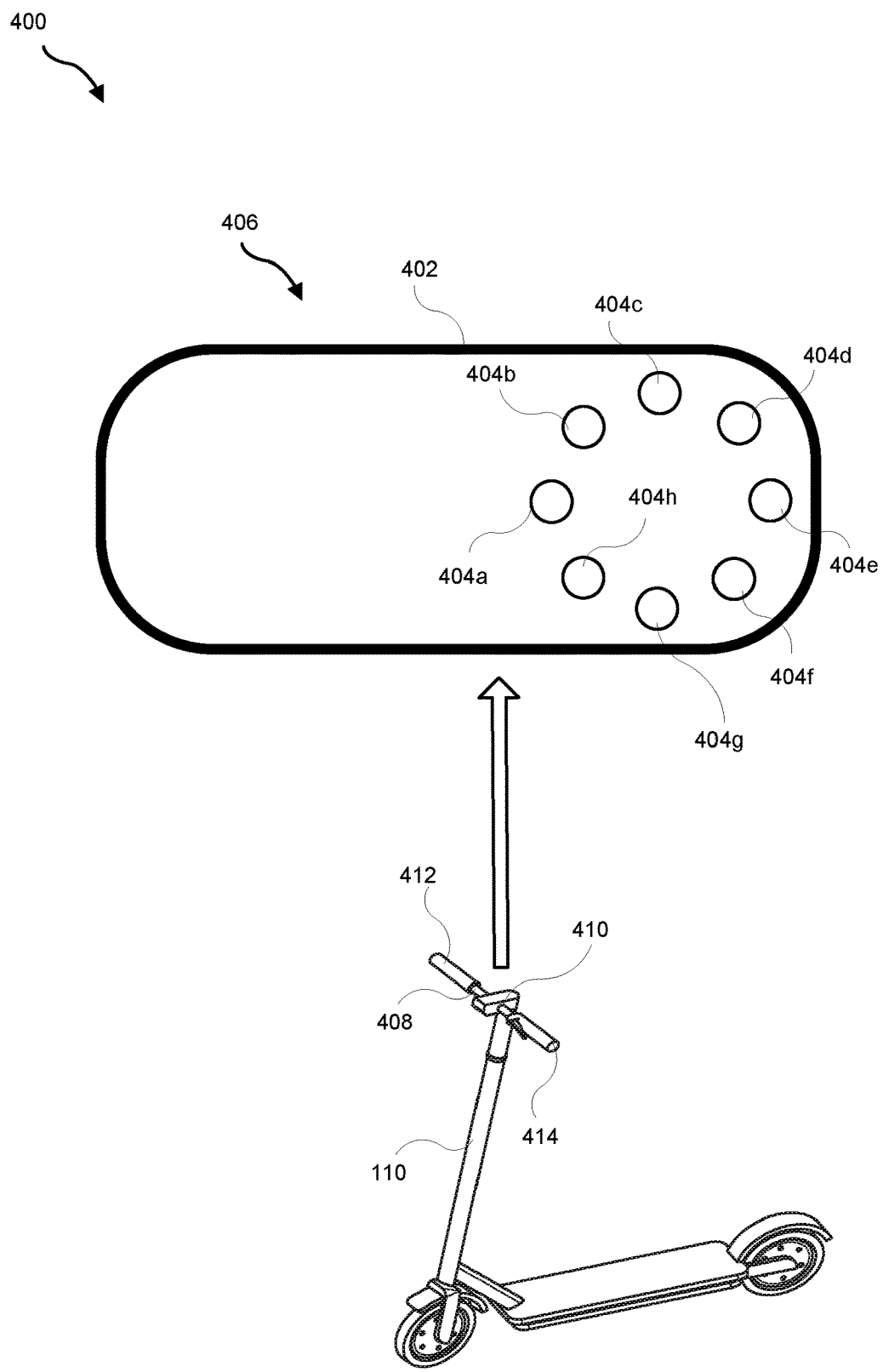
FIG. 4 is an illustration of an example computing device mounted on (coupled to) a personal mobility vehicle that includes light-emitting devices in a configuration for use as a directional indicator.

FIG. 4 is an illustration of an example computing device 402 mounted on (coupled to) a personal mobility vehicle (e.g., the personal mobility vehicle 110) that includes light-emitting devices 404*a-h* in a configuration (e.g., a ring or circle) for use as a directional indicator 406. The light-emitting devices 404*a-h* in the configuration for use as a directional indicator 406 may also be referred to herein as a display that is mounted on or coupled to the personal mobility vehicle 110. Referring to FIG. 1, the light-emitting devices 404*a-h* may provide general heading indications for use in navigating the personal mobility vehicle 110 along the route 130 from the starting location 150 to the ending location 152.

In an implementation 400, shown in FIG. 4, eight light-emitting devices 404*a-h* form a ring or circle. In some implementations, more than eight light-emitting devices may form a ring or circle. In some implementations, less than eight light-emitting devices may form a ring or circle. In the implementation 400, each of the light-emitting devices 404*a-h* are the same size. In some implementations, each of the light-emitting devices may be of one or more different sizes. In some implementations, two or more light-emitting devices may form another geometric shape that may include, but is not limited to, an oval, a square, or a rectangle.

In some implementations, a light-emitting device may be capable of emitting more than one color (e.g., two or more colors). For example, a light-emitting device may be a bicolor light-emitting diode (LED) capable of emitting two colors. For example, a light-emitting device may be a tricolor LED capable of emitting three colors (e.g., a Red-Green-Blue (RGB) LED). In some implementations, a light-emitting device may be capable of emitting a single color. For example, a light-emitting device may be a monochromatic LED (e.g., a red, green, blue, cyan, magenta, yellow, white or any color of the visible spectrum). In some implementations, the light-emitting devices may all be of the same type (e.g., the same size, and/or the same color). In some implementations, the light-emitting devices may include a combination of different types of light-emitting devices (e.g., different size light-emitting devices, different color light-emitting devices (e.g., one or more single color LEDs in combination with one or more multiple color LEDS (e.g., one or more bicolor LEDs, one or more tri-color LEDs)). In some implementations, each light-emitting device may bean LED of a different color (e.g., red, green, blue, or any color of the visible spectrum). For example, a light-emitting device may emit light waves, measured in nanometers (nm) from red (640 nm to 750 nm) to blue-violet (380 nm to 490 nm) and any other wavelengths in between (e.g., red, blue, yellow, green, etc.). A light-emitting device may emit white light that includes wavelengths from about 390 nm to 700 nm. For example, a light-emitting device may be a single-color white LED.

In the implementation 400, shown in FIG. 4, the light-emitting devices 404*a-h* are shown as round or circular. In some implementations, one or more light-emitting devices or each light-emitting device may be of any shape including, but not limited to, circular, oval, square, rectangular, or triangular.

As shown herein, a computing device mounted on (coupled to) a personal mobility vehicle may include light-emitting devices in a configuration that may provide directional information for a requestor as the requestor uses the personal mobility vehicle to travel along a route. For example, the requestor may glace at the light-emitting devices while using the personal mobility vehicle for travel along the route. The light-emitting devices may be configured such that illumination of certain devices may indicate a direction of travel (e.g., straight, slight right, right turn, slight left, left turn, U-turn, etc.). In some implementations, illumination of the light-emitting devices may include animation to more clearly indicate a direction (or in some cases an upcoming direction) of travel for the personal mobility vehicle along the route.

In the implementation 400, the example computing device 402 may be mounted on (coupled to) the personal mobility vehicle 110 at a location where a rider may easily view and interpret the directional information provided by the light-emitting devices 404*a-h*. The computing device 402 may be mounted on a handlebar 408 between a first handle 412 and a second handle 414 (e.g., at a point 410 in the middle or center of the handlebar 408 and between the first handle 412 and the second handle 414).

FIG. 5A-B to FIG. 9A-G describe the use of bounding areas to help navigate a personal mobility vehicle along a route of travel. Examples and implementations described for each figure may also be applied to the other figures. Though each figure may describe a particular implementation and use of a computing device and a bounding area, the examples and implementations may be applied to the other figures that describe the use of bounding areas.

Figure 5B:
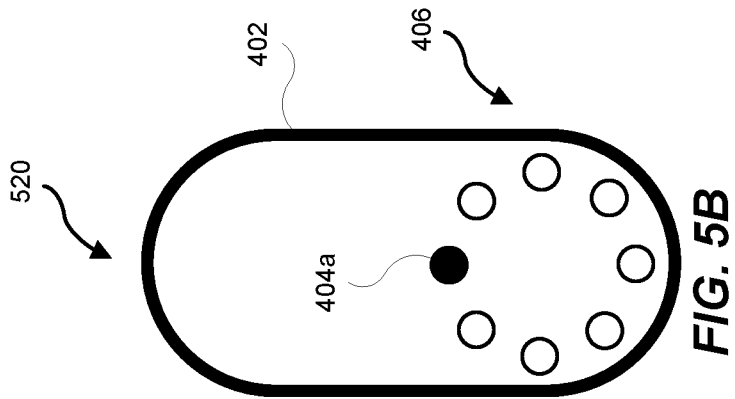
FIG. 5B is an illustration of light-emitting devices in a configuration for use as a directional indicator, providing directional information for travel along a route in the example first trip segment as shown in FIG. 5A.
Figure 5A:
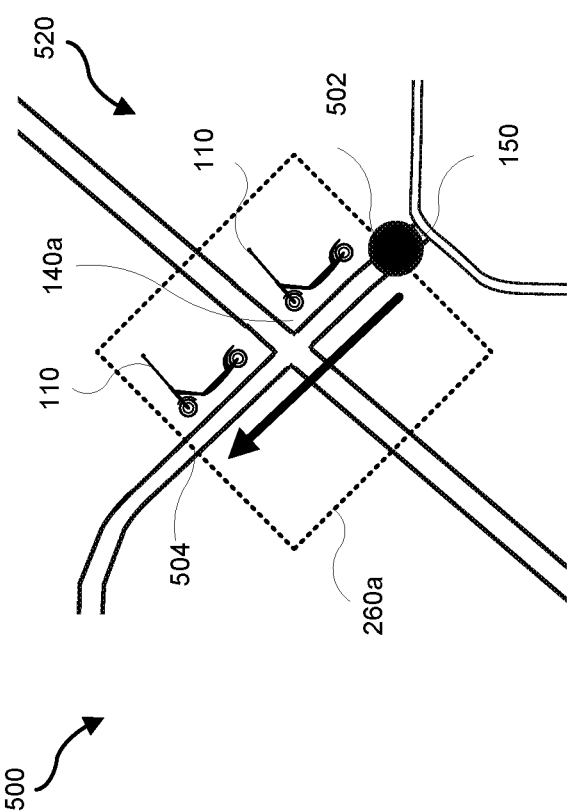
FIG. 5A is an illustration of an example first trip segment using a personal mobility vehicle for transport into and out of a first bounding area.

FIG. 5A is an illustration of an example first trip segment 500 using the personal mobility vehicle 110 for transport into and out of the bounding area 260*a*. The bounding area 260*a* may include the junction 140*a*. The personal mobility vehicle 110 may travel from an ingress point 502 or entry point of the bounding area 260*a* to a waypoint 504 (exit point or egress point) of the bounding area 260*a*.

Referring to FIG. 3, a navigation system may generate the bounding area 260*a* to include (encompass) the junction 140*a*. In the example shown in FIG. 5A, the junction 140*a* is an intersection of two roads or paths of travel that may be used or followed by the personal mobility vehicle 110. In order to navigate from the starting location 150 towards the ending location 152, the personal mobility vehicle 110 should travel straight through the junction 140*a* continuing to follow the current road or path the personal mobility vehicle 110 is traveling on.

FIG. 5B is an illustration of the light-emitting devices 404*a-h* in the configuration as shown in FIG. 4 for use as the directional indicator 406, providing directional information for travel from the ingress point 502 to the egress or waypoint point 504 of the bounding area 260*a* as shown in FIG. 5A. The light-emitting devices 404*a-h* may provide directional information for travel along the route 130 at a location 520 on the route 130. For example, also referring to FIG. 4, the light-emitting device 404*a* is illuminated (considered turned ON) while the light-emitting devices 404*b-h* are not illuminated (considered turned OFF). The directional indicator 406 may indicate forward or straight travel of the personal mobility vehicle 110 along the route 130 at the location 520.

In the example shown in FIG. 5A and FIG. 5B, and as described herein, the bounding area 260*a* may be provided to the computing device 402 in sufficient time to illuminate the light-emitting device 404*a* (and not illuminate the light-emitting devices 404*b-h*) to indicate a direction of travel of the personal mobility vehicle 110 from the ingress point 502 to the waypoint 504 and through the bounding area 260*a*. The requestor 122 may successfully navigate the personal mobility vehicle 110 through the junction 140*a* continuing along the route 130 and towards the ending location 152.

In some implementations, as described herein with reference to FIG. 11 and FIG. 12, the bounding areas 260*a-k* may be provided to the computing device 402 by a dynamic transportation matching system (and specifically a navigation system) prior to the start of travel of the personal mobility vehicle 110 along the route 130. As such, the bounding area 260*a* may be used by the computing device 402 to control the directional indicator 406 in ample time to illuminate the light-emitting device 404*a* prior to the start of travel by the requestor using the personal mobility vehicle 110.

In some implementations, as described herein with reference to FIG. 11 and FIG. 12, the bounding areas 260*a-k* may be provided by a dynamic transportation matching system (and specifically a navigation system) to the computing device 402 prior to the personal mobility vehicle 110 reaching an ingress point of a bounding area. For example, each bounding area 260*a-k* may be provided to the computing device 402 individually on an as needed basis. A bounding area may be provided to the computing device 402, however, in ample (enough) time for the computing device 402 to illuminate one or more of the light-emitting devices 404*a-h* to indicate a direction of travel of the personal mobility vehicle 110 through a navigational junction included in (encompassed by) the bounding area, and to allow for sufficient time for the requestor 122 to view the directional indicator 406, process the directional information provided by the directional indicator 406, and navigate the personal mobility vehicle 110 accordingly through the navigational junction and effectively from an ingress point of the bounding area to a waypoint of the bounding area. For the bounding area, the directional indicator may provide unambiguous directional information for use in navigating the personal mobility vehicle 110 through the bounding area from an ingress point to a waypoint and along the route of travel.

A bounding area may be of any geometric shape (e.g., a square, a rectangle, an oval, a circle, a triangle, a quadrangle, etc.). A bounding area may be defined by geolocation information and/or data (e.g., latitude and longitudinal coordinates). A bounding area may be defined by geolocation data and may be of a particular size (e.g., a number of square feet, a number of square meters, etc.). In some implementations, a size of the bounding area may, in addition or alternatively, be defined by a travel speed of the personal mobility vehicle. A personal mobility vehicle may travel at, for example, eight miles per hour (mph), ten mph, or twelve mph. Therefore, the bounding area size may be defined such that, based on the speed of travel of the personal mobility vehicle, a rider of the personal mobility vehicle may have ample time to navigate the personal mobility vehicle.

FIG. 6A is an illustration of an example second trip segment 600 using the personal mobility vehicle 110 for transport into and out of the bounding area 260*b*. The bounding area 260*b* may include the junction 140*b*. The personal mobility vehicle 110 may travel from an ingress point 602 or entry point of the bounding area 260*b* to a waypoint 604 (exit point or egress point) of the bounding area 260*b*.

Referring to FIG. 3, a navigation system may generate the bounding area 260*b* to include (encompass) the junction 140*b*. In the example shown in FIG. 6A, the junction 140*b* is an intersection of three roads or paths of travel that may be used or followed by the personal mobility vehicle 110. In order to navigate from the starting location 150 towards the ending location 152, the personal mobility vehicle 110 should proceed to the right without making a sharp right turn as the personal mobility vehicle 110 travel through the junction 140*b*.

FIGS. 6B-D are illustrations of the light-emitting devices 404*a-h* in the configuration as shown in FIG. 4 for use as the directional indicator 406, providing directional information for travel along the route 130 in the second trip segment 600 as shown in FIG. 6A.

FIG. 6B is an illustration of the light-emitting devices 404*a-h* providing directional information for travel along the route 130 at a location 606 on the route 130. Referring to FIG. 6A, the location 606 is a location along the route 130 after the waypoint 504 and before the ingress point 602. Referring to FIG. 2 and FIG. 3, once the personal mobility vehicle travels through the bounding area 260*a*, traveling to and through the waypoint 504, the next junction encountered by the personal mobility vehicle 110 along the route 130 is the junction 140*b*. As such, from the waypoint 504 to the ingress point 602, the personal mobility vehicle 110 may continue travel on a same road or path. In FIG. 6B, referring to FIG. 4, the light-emitting device 404*a* is illuminated (considered turned ON) while the light-emitting devices 404*b-h* are not illuminated (considered turned OFF). The directional indicator 406 shown in FIG. 6B may indicate forward, straight, and/or continued travel of the personal mobility vehicle 110 along the route 130 from the waypoint 504 to the ingress point 602.

In some implementations, referring to FIG. 3, the computing device 402 of the personal mobility vehicle 110 may be provided with (receive) the bounding area 360*a*. For example, an ingress point of the bounding area 360*a* may be the waypoint 504 of the bounding area 260*a*. A waypoint, egress, or exit point of the bounding area 360*a* may be the ingress point 602. The bounding area 360*a* may be received by the computing device 402 in sufficient time, as described herein, to provide the directional information on the directional indicator 406 as shown in FIG. 6B for use by the requestor 122 when navigating the personal mobility vehicle 110 along the route 130.

FIG. 6C is an illustration of the light-emitting devices 404*a-h* providing directional information for travel along the route 130 at a location 620 on the route 130. The directional information may be for travel from the ingress point 602 to the waypoint point 604 of the bounding area 260*b* as shown in FIG. 6A. For example, also referring to FIG. 4, the light-emitting device 404*b* is illuminated (considered turned ON) while the light-emitting devices 404*a* and 404*c-h* are not illuminated (considered turned OFF). The directional indicator 406 may indicate a direction of travel of the personal mobility vehicle 110 along the route 130 at the location 620.

FIG. 6D is an illustration of the light-emitting devices 404*a-h* providing directional information for travel along the route 130 at a location 608 on the route 130. Referring to FIG. 6A, the location 608 is a location along the route 130 after the waypoint 604. Referring to FIG. 2 and FIG. 3, once the personal mobility vehicle travels through the bounding area 260*b*, traveling to and through the waypoint 604, the personal mobility vehicle 110 may continue travel on a same road or path until the computing device 402 of the personal mobility vehicle 110 receives another bounding area encompassing a next junction along the route 130. In FIG. 6D, referring to FIG. 4, the light-emitting device 404*a* is illuminated (considered turned ON) while the light-emitting devices 404*b-h* are not illuminated (considered turned OFF). The directional indicator 406 shown in FIG. 6D may indicate forward, straight, and/or continued travel of the personal mobility vehicle 110 along the route 130 once the personal mobility vehicle 110 travels to and through the waypoint 604.

In some implementations, referring to FIG. 3, the computing device 402 of the personal mobility vehicle 110 may be provided with (receive) the bounding area 360*b*. For example, an ingress point of the bounding area 360*b* may be the waypoint 604 of the bounding area 260*b*. A waypoint, egress, or exit point of the bounding area 360*a* may be an ingress point for the bounding area 260*c*. The bounding area 360*b* may be received by the computing device 402 in sufficient time, as described herein, to provide the directional information on the directional indicator 406 as shown in FIG. 6D for use by the requestor 122 when navigating the personal mobility vehicle 110 along the route 130.

In the example shown in FIG. 6A and FIG. 6C, and as described herein, the bounding area 260*b* may be provided to the computing device 402 in sufficient time to illuminate the light-emitting device 404*b* (and not illuminate the light-emitting devices 404*a* and 404*c-h*) to indicate a direction of travel of the personal mobility vehicle 110 from the ingress point 602 to the waypoint 604 and through the bounding area 260*b*. The requestor 122 may successfully navigate the personal mobility vehicle 110 through the junction 140*b* continuing along the route 130 and towards the ending location 152.

FIG. 7A is an illustration of an example third trip segment 700 using the personal mobility vehicle 110 for transport into and out of the bounding area 260*c*. The bounding area 260*c* may include the junction 140*c*. The personal mobility vehicle 110 may travel from an ingress point 702 or entry point of the bounding area 260*c* to a waypoint 704 (exit point or egress point) of the bounding area 260*c*.

Referring to FIG. 3, a navigation system may generate the bounding area 260*c* to include (encompass) the junction 140*c*. In the example shown in FIG. 7A, the junction 140*c* is an intersection of two roads or paths of travel that may be used or followed by the personal mobility vehicle 110. In order to navigate from the starting location 150 towards the ending location 152, the personal mobility vehicle 110 should proceed to make a left turn as the personal mobility vehicle 110 travel through the junction 140*c*.

FIGS. 7B-D are illustrations of the light-emitting devices 404*a-h* in the configuration as shown in FIG. 4 for use as the directional indicator 406, providing directional information for travel along the route 130 in the third trip segment 700 as shown in FIG. 7A.

FIG. 7B is an illustration of the light-emitting devices 404*a-h* providing directional information for travel along the route 130 at a location 706 on the route 130. Referring to FIG. 7A, the location 706 is a location along the route 130 after the waypoint 604 and before the ingress point 702. Referring to FIG. 2 and FIG. 3, once the personal mobility vehicle travels through the bounding area 260*b*, traveling to and through the waypoint 604, the next junction encountered by the personal mobility vehicle 110 along the route 130 is the junction 140*c*. As such, from the waypoint 604 to the ingress point 702, the personal mobility vehicle 110 may continue travel on a same road or path. In FIG. 7B, referring to FIG. 4, the light-emitting device 404*a* is illuminated (considered turned ON) while the light-emitting devices 404*b-h* are not illuminated (considered turned OFF). The directional indicator 406 shown in FIG. 7B may indicate forward, straight, and/or continued travel of the personal mobility vehicle 110 along the route 130 from the waypoint 604 to the ingress point 702.

In some implementations, referring to FIG. 3, the computing device 402 of the personal mobility vehicle 110 may be provided with (receive) the bounding area 360*b*. For example, an ingress point of the bounding area 360*b* may be the waypoint 604 of the bounding area 260*b*. A waypoint, egress, or exit point of the bounding area 360*b* may be the ingress point 702. The bounding area 360*b* may be received by the computing device 402 in sufficient time, as described herein, to provide the directional information on the directional indicator 406 as shown in FIG. 7B for use by the requestor 122 when navigating the personal mobility vehicle 110 along the route 130.

FIG. 7C is an illustration of the light-emitting devices 404a-h providing directional information for travel along the route 130 at a location 720 on the route 130. The directional information may be for travel from the ingress point 702 to the egress or waypoint 704 of the bounding area 260c as shown in FIG. 7A. For example, also referring to FIG. 4, the light-emitting device 404g is illuminated (considered turned ON) while the light-emitting devices 404a-f and 404h are not illuminated (considered turned OFF). The directional indicator 406 may indicate a direction of travel of the personal mobility vehicle 110 along the route 130 at the location 720.

FIG. 7D is an illustration of the light-emitting devices 404a-h providing directional information for travel along the route 130 at a location 708 on the route 130. Referring to FIG. 7A, the location 708 is a location along the route 130 after the waypoint 704. Referring to FIG. 2 and FIG. 3, once the personal mobility vehicle travels through the bounding area 260c, traveling to and through the waypoint 704, the personal mobility vehicle 110 may continue travel on a same road or path until the computing device 402 of the personal mobility vehicle 110 receives another bounding area encompassing a next junction along the route 130. In FIG. 7D, referring to FIG. 4, the light-emitting device 404a is illuminated (considered turned ON) while the light-emitting devices 404b-h are not illuminated (considered turned OFF). The directional indicator 406 shown in FIG. 7D may indicate forward, straight, and/or continued travel of the personal mobility vehicle 110 along the route 130 once the personal mobility vehicle 110 travels to and through the waypoint 704.

In some implementations, referring to FIG. 3, the computing device 402 of the personal mobility vehicle 110 may be provided with (receive) the bounding area 360c. For example, an ingress point of the bounding area 360c may be the waypoint 704 of the bounding area 260c. A waypoint, egress, or exit point of the bounding area 360b may be an ingress point for the bounding area 260d. The bounding area 360c may be received by the computing device 402 in sufficient time, as described herein, to provide the directional information on the directional indicator 406 as shown in FIG. 6D for use by the requestor 122 when navigating the personal mobility vehicle 110 along the route 130.

In the example shown in FIG. 7A and FIG. 7C, and as described herein, the bounding area 260c may be provided to the computing device 402 in sufficient time to illuminate the light-emitting device 404g (and not illuminate the light-emitting devices 404a-f and 404h) to indicate a direction of travel of the personal mobility vehicle 110 from the ingress point 702 to the waypoint 704 and through the bounding area 260c. The requestor 122 may successfully navigate the personal mobility vehicle 110 through the junction 140c continuing along the route 130 and towards the ending location 152.

FIG. 8A is an illustration of an example fourth trip segment 800 using the personal mobility vehicle 110 for transport through the consecutive bounding areas 260d-g. The bounding areas 260d-g may include the junctions 140d-g, respectively. The personal mobility vehicle 110 may travel from an ingress point 602 or entry point of the bounding area 260d to a waypoint 810 (exit point or egress point) of the bounding area 260g when traveling through the fourth trip segment 800 that may be considered a roundabout or traffic circle.

Referring to FIG. 3, a navigation system may generate the bounding area 260d to include (encompass) the junction 140d. A navigation system may generate the bounding area 260e to include (encompass) the junction 140e. A navigation system may generate the bounding area 260f to include (encompass) the junction 140f. A navigation system may generate the bounding area 260g to include (encompass) the junction 140g. In the example shown in FIG. 8A, the junctions 140d-g are included in a roundabout or traffic circle that may be roads or paths of travel that may be used or followed by the personal mobility vehicle 110. In order to navigate from the starting location 150 towards the ending location 152, the personal mobility vehicle 110 should proceed through the traffic circle and exit the traffic circle at the junction 140g.

As shown in FIG. 8A, in order to navigate into and out of the fourth trip segment 800, the bounding areas 260d-g may be consecutive bounding areas of a certain size. A size of each of the bounding areas 260d-g may be based, in part, on the proximity of the junctions 140d-g, respectively. For example, a navigation system may generate each of the bounding areas 260d-g to encompass (include) each junction 140d-g, respectively, but also to provide adequate directional information to the computing device 402 to provide the control of the illumination of the light-emitting devices 404a-h of the directional indicator 406 in enough time to allow the requestor 122 the ability to navigate the personal mobility vehicle 110 around and through the traffic circle (the fourth trip segment 800).

In implementations where a navigation system may provide bounding areas on an as needed basis, the navigation system may provide the bounding areas 260d-g (consecutive bounding areas that each include a navigational junction) together and at a same time to the computing device 402 of the personal mobility vehicle 110. Doing so may allow the computing device 402 to control the light-emitting devices 404a-h of the directional indicator 406 in sufficient time for the requestor 122 to successfully navigate the personal mobility vehicle 110 around and through the traffic circle (the fourth trip segment 800).

FIGS. 8B-G are illustrations of the light-emitting devices 404a-h in the configuration as shown in FIG. 4 for use as the directional indicator 406, providing directional information for travel along the route 130 in the fourth trip segment 800 as shown in FIG. 8A.

FIG. 8B is an illustration of the light-emitting devices 404a-h providing directional information for travel along the route 130 at a location 816 on the route 130. Referring to FIG. 8A, the location 816 is a location along the route 130 after the waypoint 704 and before the ingress point 802. Referring to FIG. 2 and FIG. 3, once the personal mobility vehicle travels through the bounding area 260c, traveling to and through the waypoint 704, the next junction encountered by the personal mobility vehicle 110 along the route 130 is the junction 140d. As such, from the waypoint 704 to the ingress point 802, the personal mobility vehicle 110 may continue travel on a same road or path. In FIG. 8B, referring to FIG. 4, the light-emitting device 404a is illuminated (considered turned ON) while the light-emitting devices 404b-h are not illuminated (considered turned OFF). The directional indicator 406 shown in FIG. 8B may indicate forward, straight, and/or continued travel of the personal mobility vehicle 110 along the route 130 from the waypoint 704 to the ingress point 802.

In some implementations, referring to FIG. 3, the computing device 402 of the personal mobility vehicle 110 may be provided with (receive) the bounding area 360c. For example, an ingress point of the bounding area 360c may be the waypoint 704 of the bounding area 260c. A waypoint, egress, or exit point of the bounding area 360c may be the ingress point 802. The bounding area 360c may be received by the computing device 402 in sufficient time, as described herein, to provide the directional information on the directional indicator 406 as shown in FIG. 8B for use by the requestor 122 when navigating the personal mobility vehicle 110 along the route 130.

FIG. 8C is an illustration of the light-emitting devices 404a-h providing directional information for travel along the route 130 at a location 820 on the route 130. The directional information may be for travel from the ingress point 802 to the egress point or waypoint 804 of the bounding area 260d as shown in FIG. 8A. For example, also referring to FIG. 4, the light-emitting device 404b is illuminated (considered turned ON) while the light-emitting devices 404a and 404c-h are not illuminated (considered turned OFF). The directional indicator 406 may indicate a direction of travel of the personal mobility vehicle 110 along the route 130 at the location 820. For example, the directional indicator 406 may indicate a direction of travel of the personal mobility vehicle 110 to be to the right when entering the traffic circle.

FIG. 8D is an illustration of the light-emitting devices 404a-h providing directional information for travel along the route 130 at a location 822 on the route 130. The directional information may be for travel from the waypoint 804 of the bounding area 260d (which is also an ingress point of the bounding area 260e as bounding area 260d and bounding area 260e are consecutive adjacent bounding areas) to an egress point or waypoint 806 of the bounding area 260e as shown in FIG. 8A. For example, also referring to FIG. 4, the light-emitting device 404h is illuminated (considered turned ON) while the light-emitting devices 404a-g are not illuminated (considered turned OFF). The directional indicator 406 may indicate a direction of travel of the personal mobility vehicle 110 along the route 130 at the location 822. For example, the directional indicator 406 may indicate a direction of travel of the personal mobility vehicle 110 to be to the left continuing travel in the traffic circle.

FIG. 8E is an illustration of the light-emitting devices 404a-h providing directional information for travel along the route 130 at a location 824 on the route 130. The directional information may be for travel from the waypoint 806 of the bounding area 260e (which is also an ingress point of the bounding area 260f as bounding area 260e and bounding area 260f are consecutive adjacent bounding areas) to an egress point or waypoint 808 of the bounding area 260f as shown in FIG. 8A. For example, also referring to FIG. 4, the light-emitting device 404h is illuminated (considered turned ON) while the light-emitting devices 404a-g are not illuminated (considered turned OFF). The directional indicator 406 may indicate a direction of travel of the personal mobility vehicle 110 along the route 130 at the location 824. For example, the directional indicator 406 may indicate a direction of travel of the personal mobility vehicle 110 continue to travel to the left continuing travel in the traffic circle.

FIG. 8F is an illustration of the light-emitting devices 404a-h providing directional information for travel along the route 130 at a location 826 on the route 130. The directional information may be for travel from the waypoint 808 of the bounding area 260f (which is also an ingress point of the bounding area 260g as bounding area 260f and bounding area 260g are consecutive adjacent bounding areas) to an egress point or waypoint 810 of the bounding area 260g as shown in FIG. 8A. For example, also referring to FIG. 4, the light-emitting device 404g is illuminated (considered turned ON) while the light-emitting devices 404a-f and 404h are not illuminated (considered turned OFF). The directional indicator 406 may indicate a direction of travel of the personal mobility vehicle 110 along the route 130 at the location 826. For example, the directional indicator 406 may indicate that the personal mobility vehicle 110 should turn to the right at the junction 140g and exit the traffic circle.

FIG. 8G is an illustration of the light-emitting devices 404a-h providing directional information for travel along the route 130 at a location 818 on the route 130. Referring to FIG. 8A, the location 818 is a location along the route 130 after the waypoint 810. Referring to FIG. 2 and FIG. 3, once the personal mobility vehicle travels through the bounding area 260g, traveling to and through the waypoint 810, the personal mobility vehicle 110 may continue travel on a same road or path until the computing device 402 of the personal mobility vehicle 110 receives another bounding area encompassing a next junction along the route 130. In FIG. 8G, referring to FIG. 4, the light-emitting device 404a is illuminated (considered turned ON) while the light-emitting devices 404b-h are not illuminated (considered turned OFF). The directional indicator 406 shown in FIG. 8G may indicate forward, straight, and/or continued travel of the personal mobility vehicle 110 along the route 130 once the personal mobility vehicle 110 travels to and through the waypoint 810.

In some implementations, referring to FIG. 3, the computing device 402 of the personal mobility vehicle 110 may be provided with (receive) the bounding area 360d. For example, an ingress point of the bounding area 360d may be the waypoint 810 of the bounding area 260g. A waypoint, egress, or exit point of the bounding area 360d may be an ingress point for the bounding area 260h. The bounding area 360d may be received by the computing device 402 in sufficient time, as described herein, to provide the directional information on the directional indicator 406 as shown in FIG. 8G for use by the requestor 122 when navigating the personal mobility vehicle 110 along the route 130. For example, a navigation system may provide the bounding area 360d when providing the bounding areas 260d-g.

FIG. 9A is an illustration of an example fifth trip segment 900 using the personal mobility vehicle 110 for transport through the consecutive bounding areas 260h-k. The bounding areas 260h-k may include the junctions 140h-k, respectively. The personal mobility vehicle 110 may travel from an ingress point 902 or entry point of the bounding area 260h to a waypoint 910 (exit point or egress point) of the bounding area 260k when traveling through the fifth trip segment 900.

Referring to FIG. 3, a navigation system may generate the bounding area 260h to include (encompass) the junction 140h. A navigation system may generate the bounding area 260i to include (encompass) the junction 140i. A navigation system may generate the bounding area 260j to include (encompass) the junction 140j. A navigation system may generate the bounding area 260k to include (encompass) the junction 140k.

As shown in FIG. 9A, in order to navigate into and out of the fifth trip segment 900, the bounding areas 260h-k may be consecutive bounding areas of a certain size. A size of each of the bounding areas 260h-k may be based, in part, on the proximity of the junctions 140h-k, respectively. For example, a navigation system may generate each of the bounding areas 260h-k to encompass (include) each junction 140h-k, respectively, but also to provide adequate directional information to the computing device 402 to provide the control of the illumination of the light-emitting devices 404a-h of the directional indicator 406 in enough time to allow the requestor 122 the ability to navigate the personal mobility vehicle 110 from the ingress point 902 to the waypoint 910 (the fifth trip segment 900).

In implementations where a navigation system may provide bounding areas on an as needed basis, the navigation system may provide the bounding areas 260h-k (consecutive bounding areas that each include a navigational junction) together and at a same time to the computing device 402 of the personal mobility vehicle 110. Doing so may allow the computing device 402 to control the light-emitting devices 404a-h of the directional indicator 406 in sufficient time for the requestor 122 to successfully navigate the personal mobility vehicle 110 from the ingress point 902 to the waypoint 910 (the fifth trip segment 900).

FIGS. 9B-G are illustrations of the light-emitting devices 404a-h in the configuration as shown in FIG. 4 for use as the directional indicator 406, providing directional information for travel along the route 130 in the fifth trip segment 900 as shown in FIG. 9A.

FIG. 9B is an illustration of the light-emitting devices 404a-h providing directional information for travel along the route 130 at a location 916 on the route 130. Referring to FIG. 9A, the location 916 is a location along the route 130 after the waypoint 810 and before the ingress point 902. Referring to FIG. 2 and FIG. 3, once the personal mobility vehicle travels through the bounding area 260g, traveling to and through the waypoint 810, the next junction encountered by the personal mobility vehicle 110 along the route 130 is the junction 140h. As such, from the waypoint 810 to the ingress point 902, the personal mobility vehicle 110 may continue travel on a same road or path. In FIG. 9B, referring to FIG. 4, the light-emitting device 404a is illuminated (considered turned ON) while the light-emitting devices 404b-h are not illuminated (considered turned OFF). The directional indicator 406 shown in FIG. 9B may indicate forward, straight, and/or continued travel of the personal mobility vehicle 110 along the route 130 from the waypoint 810 to the ingress point 902.

In some implementations, referring to FIG. 3, the computing device 402 of the personal mobility vehicle 110 may be provided with (receive) the bounding area 360d. For example, an ingress point of the bounding area 360d may be the waypoint 810 of the bounding area 260g. A waypoint, egress, or exit point of the bounding area 360d may be the ingress point 902. The bounding area 360d may be received by the computing device 402 in sufficient time, as described herein, to provide the directional information on the directional indicator 406 as shown in FIG. 9B for use by the requestor 122 when navigating the personal mobility vehicle 110 along the route 130.

FIG. 9C is an illustration of the light-emitting devices 404a-h providing directional information for travel along the route 130 at a location 920 on the route 130. The directional information may be for travel from the ingress point 902 to the egress point or waypoint 904 of the bounding area 260h as shown in FIG. 9A. For example, also referring to FIG. 4, the light-emitting device 404g is illuminated (considered turned ON) while the light-emitting devices 404a-f and 404h are not illuminated (considered turned OFF). The directional indicator 406 may indicate a direction of travel of the personal mobility vehicle 110 along the route 130 at the location 920. For example, the directional indicator 406 may indicate that the personal mobility vehicle 110 should make a left turn at the junction 140h.

FIG. 9D is an illustration of the light-emitting devices 404a-h providing directional information for travel along the route 130 at a location 922 on the route 130. The directional information may be for travel from the waypoint 904 of the bounding area 260h (which is also an ingress point of the bounding area 260i as bounding area 260h and bounding area 260i are consecutive adjacent bounding areas) to an egress point or waypoint 906 of the bounding area 260i as shown in FIG. 9A. For example, also referring to FIG. 4, the light-emitting device 404c is illuminated (considered turned ON) while the light-emitting devices 404a-b and 404d-h are not illuminated (considered turned OFF). The directional indicator 406 may indicate a direction of travel of the personal mobility vehicle 110 along the route 130 at the location 922. For example, the directional indicator 406 may indicate that the personal mobility vehicle 110 should make a right turn at the junction 140i.

FIG. 9E is an illustration of the light-emitting devices 404a-h providing directional information for travel along the route 130 at a location 924 on the route 130. The directional information may be for travel from the waypoint 906 of the bounding area 260i (which is also an ingress point of the bounding area 260j as bounding area 260i and bounding area 260j are consecutive adjacent bounding areas) to an egress point or waypoint 908 of the bounding area 260j as shown in FIG. 9A. For example, also referring to FIG. 4, the light-emitting device 404a is illuminated (considered turned ON) while the light-emitting devices 404b-h are not illuminated (considered turned OFF). The directional indicator 406 may indicate a direction of travel of the personal mobility vehicle 110 along the route 130 at the location 924. For example, the directional indicator 406 may indicate that the personal mobility vehicle 110 continue to travel straight along the route 130.

FIG. 9F is an illustration of the light-emitting devices 404a-h providing directional information for travel along the route 130 at a location 926 on the route 130. The directional information may be for travel from the waypoint 908 of the bounding area 260j (which is also an ingress point of the bounding area 260k as bounding area 260j and bounding area 260k are consecutive adjacent bounding areas) to an egress point or waypoint 910 of the bounding area 260k as shown in FIG. 9A. For example, also referring to FIG. 4, the light-emitting device 404g is illuminated (considered turned ON) while the light-emitting devices 404a-f and 404h are not illuminated (considered turned OFF). The directional indicator 406 may indicate a direction of travel of the personal mobility vehicle 110 along the route 130 at the location 926. For example, the directional indicator 406 may indicate that the personal mobility vehicle 110 should turn to the right at the junction 140k.

FIG. 9G is an illustration of the light-emitting devices 404a-h providing directional information for travel along the route 130 at a location 918 on the route 130. Referring to FIG. 9A, the location 918 is a location along the route 130 after the waypoint 910. Referring to FIG. 2 and FIG. 3, once the personal mobility vehicle travels through the bounding area 260k, traveling to and through the waypoint 910, the personal mobility vehicle 110 may continue travel on a same road or path until the personal mobility vehicle 110 reaches the ending location 152. In FIG. 9G, referring to FIG. 4, the light-emitting device 404a is illuminated (considered turned ON) while the light-emitting devices 404b-h are not illuminated (considered turned OFF). The directional indicator 406 shown in FIG. 9G may indicate forward, straight, and/or continued travel of the personal mobility vehicle 110 along the route 130 once the personal mobility vehicle 110 travels to and through the waypoint 810.

In some implementations, the personal mobility vehicle 110 may continue travel on a same road or path until the computing device 402 of the personal mobility vehicle 110 receives another bounding area that includes the ending location 152. In some implementations, referring to FIG. 3, the computing device 402 of the personal mobility vehicle 110 may be provided with (receive) the bounding area 360e. For example, an ingress point of the bounding area 360e may be the waypoint 910 of the bounding area 260k. A waypoint, egress, or exit point of the bounding area 360d may be the ending location 152.

In some implementations, an ingress point and/or a size of a bounding area may be determined by a pre-determined, assumed, or predicted speed of travel a personal mobility vehicle. In a non-limiting example, a speed of travel of a personal mobility vehicle may be predicted (assumed or determined) based on one or more of a model or type of personal mobility vehicle (e.g., typical miles per hour (mph) for the personal mobility vehicle) and a condition of the road or path of travel (e.g., a paved path for use by the personal mobility vehicle, a personal mobility vehicle or bike path of a roadway, a high-traffic road or path etc.).

In some implementations, a number of bounding areas provided to a computing device of a personal mobility vehicle may vary based on one or more factors that may include, but are not limited to, a number of navigational junctions along a route of travel for the personal mobility vehicle, a distance between each navigational junction, a travel speed of the personal mobility vehicle, and a size of each bounding area.

In some implementations, navigation along a route may involve many navigational junction points that are geographically close to one another. In these implementations, some bounding areas may be of a size smaller than other bounding areas used for navigation of the route of travel. The smaller bounding areas may be needed to allow for the smooth navigation of the personal mobility vehicle through geographically close junction points (e.g., a traffic circle, a roundabout). Therefore, a size of a bounding area may be determined based on multiple criteria that may include but are not limited to, speed of travel of the personal mobility vehicle along the travel route and relative proximity of one navigational junction point to another navigational junction point in order to provide a bounding area to a computing device of a personal mobility vehicle navigation in sufficient time to provide directional information for use by the computing device when controlling a directional indicator.

Figure 10B:
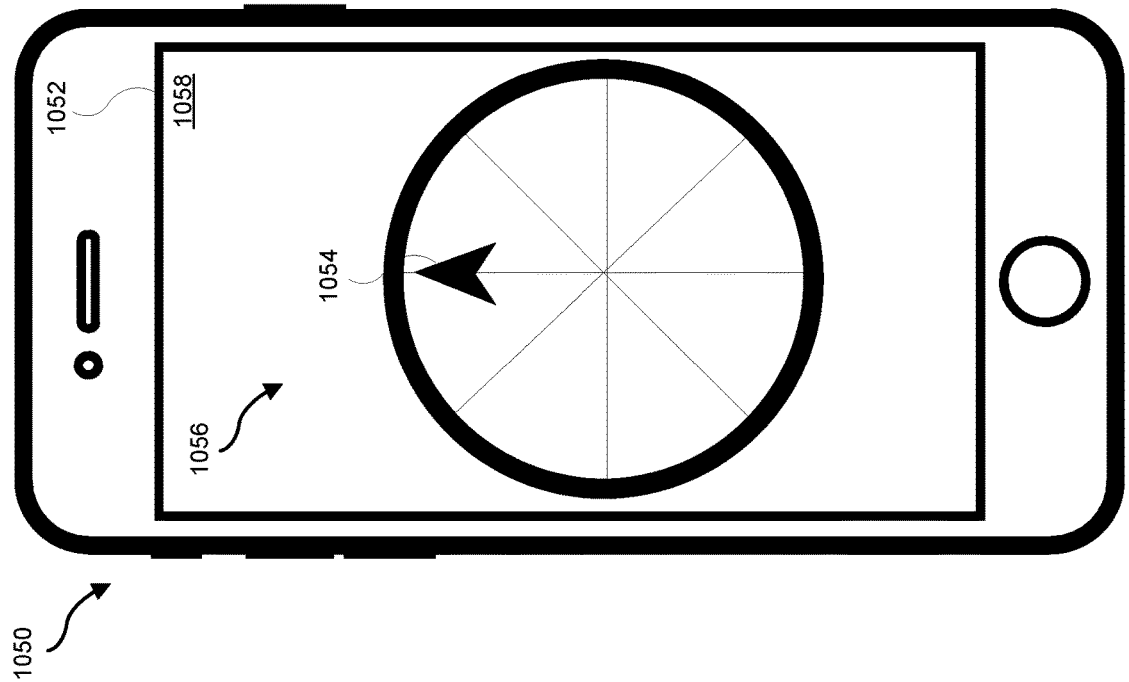
FIG. 10B is an illustration of an example computing device of a transportation requestor that includes a display device showing a second example of a directional indicator in a graphical user interface displayed on the display device.
Figure 10A:
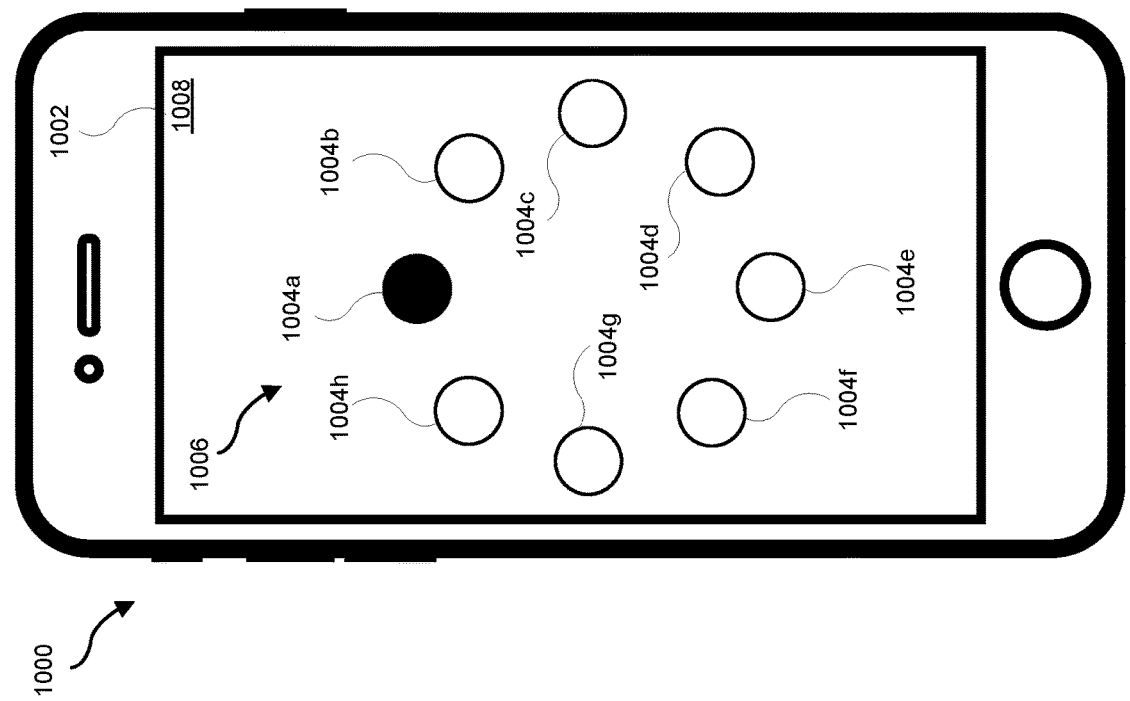
FIG. 10A is an illustration of an example computing device of a transportation requestor that includes a display device showing a first example of a directional indicator in a graphical user interface displayed on the display device.

FIG. 10A is an illustration of an example computing device 1000 of a transportation requestor (e.g., the requestor 122 as shown in FIG. 1) that includes a display device 1002 showing (displaying) a directional indicator 1006 in a graphical user interface 1008 displayed on the display device 1002. For example, the directional indicator 1006 may provide a visual indication of a direction of travel of a personal mobility vehicle for use by the transportation requestor. The directional indicator 1006 may include areas 1004a-h that may be illuminated or not illuminated to indicate a direction of travel of the transportation requestor when riding a personal mobility vehicle. For example, the control of the illuminating (and not illuminating) of the areas 1004a-h may be controlled by the computing device 1000 in a manner similar to the control of the turning on and off of light-emitting devices included in the example computing devices mounted on (coupled to) the personal mobility vehicles as described herein when navigating the personal mobility vehicle along a route of travel. Though shown as circles, the areas 1004a-h may be any geometric shape that may include, but is not limited to, an oval, a square, a diamond, a star, or a rectangle. Though shown as areas 1004a-h, the directional indicator 1006 may include any number of areas where the location, size, and or shape of the areas for implementing the directional indicator in the graphical user interface on the display device 1002 may vary in location, size and/or shape.

FIG. 10B is an illustration of an example computing device 1050 of a transportation requestor (e.g., the requestor 122 as shown in FIG. 1) that includes a display device 1052 showing (displaying) a directional indicator 1056 in a graphical user interface 1058 displayed on the display device 1052. For example, the directional indicator 1056 may provide a visual indication of a direction of travel of a personal mobility vehicle for use by the transportation requestor. The directional indicator 1056 may be a type of digital compass where an arrow 1054 indicates a direction of travel of the personal mobility vehicle. For example, the location of the arrow 1054 along the directional indicator 1056 may be controlled by the computing device 1050 in a manner similar to the control of the turning on and off of light-emitting devices included in the example computing devices mounted on (coupled to) the personal mobility vehicles as described herein when navigating the personal mobility vehicle along a route of travel.

The directional indicator 1006 and the directional indicator 1056 indicate that the requestor should continue travel in a forward direction, continuing along a route of travel.

In some implementations, a personal mobility vehicle may include a bracket or other type of mounting device that may allow the transportation requestor to mount (couple) the computing device 1000 or the computing device 1050 to a personal mobility vehicle for use in navigating the personal mobility vehicle along a route of travel.

FIG. 11 is a block diagram of an example system 1100 for matching transportation requests with a dynamic transportation network that includes the use of bounding areas to provide navigation information and data to personal mobility vehicles with mounted computing devices that include light-emitting devices that provide directional information based on the navigation information and data included in the bounding areas.

FIG. 11 shows a computing device of a transportation requestor 1102 (transportation requestor computing device 1156) interacting/interfacing with a dynamic transportation matching system 1110 that further interacts/interfaces with a personal mobility vehicle computing device 1134 mounted on (coupled to) a personal mobility vehicle 1170. For example, referring to FIG. 1, the requestor 122 may be the requestor 1102. For example, referring to FIG. 4, the personal mobility vehicle computing device 1134 that may be mounted on (coupled to) the personal mobility vehicle 1170 may be the computing device 402 that may be mounted on (coupled to) the personal mobility vehicle 110.

As shown in FIG. 11, a dynamic transportation matching system 1110 may be configured with one or more dynamic transportation matching modules 1112 that may perform one or more of the steps described herein. The dynamic transportation matching system 1110 may represent any computing system and/or set of computing systems capable of matching transportation requests. The dynamic transportation matching system 1110 may be in communication with the personal mobility vehicle computing device 1134. In some implementations, the dynamic transportation matching system 1110 may be in communication with more than one (e.g., two or more) personal mobility vehicle computing devices coupled to respective personal mobility vehicles.

The personal mobility vehicle 1170 may represent any personal mobility vehicle that may fulfill transportation requests. In some examples, the personal mobility vehicle 1170 may represent disparate personal mobility vehicle types and/or models. In some examples, the personal mobility vehicle 1170 may represent standard commercially available personal mobility vehicles. In some examples, the personal mobility vehicle 1170 may be human-operated. In some examples, the personal mobility vehicle 1170 may also be partly autonomous (or fully autonomous). Accordingly, throughout the instant disclosure, references to a "transportation provider" (or "provider") may, where appropriate, refer to a vehicle piloted by a requestor, and/or an autonomous system for piloting a vehicle. While FIG. 11 does not specify a number of personal mobility vehicles, it may be readily appreciated that the systems described herein are applicable to hundreds of personal mobility vehicles, thousands of personal mobility vehicles, or more. In some examples, the personal mobility vehicle 1170 may be included in a dynamic transportation network that may provide (supply) transportation on an on-demand basis to transportation requestors.

As described herein, the dynamic transportation matching system 1110 may communicate with the transportation requestor computing device 1156 and the personal mobility vehicle computing device 1134. The transportation requestor computing device 1156 and the personal mobility vehicle computing device 1134 may be any suitable type of computing device. As described herein, the personal mobility vehicle computing device 1134 may be mounted on or otherwise coupled to the personal mobility vehicle 1170. In some examples, the transportation requestor computing device 1156 and/or the personal mobility vehicle computing device 1134 may be mobile devices. For example, the transportation requestor computing device 1156 and/or the personal mobility vehicle computing device 1134 may be a smartphone.

Additionally, or alternatively, the transportation requestor computing device 1156 and/or the personal mobility vehicle computing device 1134 may be tablet computers, personal digital assistants, or any other type or form of mobile computing device. According to some examples, the transportation requestor computing device 1156 and/or the personal mobility vehicle computing device 1134 may include wearable computing devices (e.g., a driver-wearable computing device), such as smart glasses, smart watches, etc. In some examples, the transportation requestor computing device 1156 and/or the personal mobility vehicle computing device 1134 may be a device suitable for temporarily mounting on a personal mobility vehicle (e.g., for use by a requestor and/or provider for a transportation matching application, a navigation application, and/or any other application suited for the use of requestors and/or providers). Additionally, or alternatively, the personal mobility vehicle computing device 1134 may be a device suitable for permanently mounting on or coupling to a personal mobility vehicle that has a personal mobility vehicle application installed on the computer (e.g., personal mobility vehicle application 1142) to provide transportation services to transportation requestors and/or to communicate with the dynamic transportation matching system 1110.

As shown in FIG. 11, the personal mobility vehicle computing device 1134 may include the personal mobility vehicle (PMV) application 1142. The PMV application 1142 may represent any application, program, and/or module that may provide one or more services related to operating a personal mobility vehicle and/or providing transportation matching services. In addition, and as is described in greater detail herein, the PMV application 1142 may provide the dynamic transportation matching system 1110 with information about the personal mobility vehicle (including, e.g., a current location of the personal mobility vehicle) to enable the dynamic transportation matching system 1110 to provide dynamic transportation matching and/or management services for the provider and one or more requestors.

The personal mobility vehicle 1170 may have one or more personal mobility vehicle peripheral devices 1120 mounted on (coupled to) the personal mobility vehicle 1170. For example, the personal mobility vehicle peripheral devices 1120 may include a location device 1122 and/or a directional device 1124. For example, the directional device 1124 may determine a current direction of travel (e.g., north, south, east, west, or any combination) based on a current orientation of the personal mobility vehicle 1170 (a current orientation of the directional indicator 1116). The location device 1122 may identify a current location of the personal mobility vehicle 1170 in geolocation coordinates (e.g., latitude, longitude, global positioning system (GPS) coordinates).

For example, the location device 1122 alone or in combination with the directional device 1124 may provide information and data to the personal mobility vehicle computing device 1134 for use by a navigation application 1146 included in the PMV computing device 1134. The navigation application 1146 may provide location information identifying a current location of the personal mobility vehicle 1170 to a personal mobility vehicle data module 1166 included in the dynamic transportation matching system 1110. The personal mobility vehicle computing device 1134 may also provide availability information for the personal mobility vehicle 1170 (e.g., if the personal mobility vehicle 1170 is currently in use, if the personal mobility vehicle 1170 is available for use (e.g., the personal mobility vehicle is not currently in use, a battery of the personal mobility vehicle is fully charged, etc.)).

Other personal mobility vehicle computing devices associated with respective personal mobility vehicles may also provide location and availability information of the respective personal mobility vehicle to the personal mobility vehicle data module 1166. A personal mobility vehicle management module 1114 may access the personal mobility vehicle data module 1166 when determining the availability of and locations of personal mobility vehicles. The personal mobility vehicle management module 1114 may interface with a matching module 1118 when matching a personal mobility vehicle with a requestor using the location and availability information.

In some examples, the PMV application 1142 may coordinate communications and/or a payment with the dynamic transportation matching system 1110. For example, the payment may be between the requestor and the dynamic transportation matching system 1110. According to some embodiments, the PMV application 1142 may provide a map service, a navigation service, a traffic notification service, and/or a geolocation service. In some implementations, the navigation service and/or the geolocation service may be implemented by a navigation application 1146.

Embodiments of the instant disclosure may include or be implemented in conjunction with the dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ride sourcing service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities), a mapping system, a navigation system (e.g., to help a requestor reach and/or locate a personal mobility vehicle, and/or to help a requestor reach a destination using a personal mobility vehicle), a reputation system (e.g., to rate and/or gauge the trustworthiness of a requestor), a payment system, and/or an autonomous or semi-autonomous driving system. The transportation matching system may be implemented on various platforms, including a requestor-owned mobile device, a server computer system, or any other hardware platform capable of providing transportation matching services to one or more requestors.

As shown in FIG. 11, the dynamic transportation matching system 1110 may include dynamic transportation matching modules 1112, a request module 1104, personal mobility vehicle interface modules 1172, and a navigation system 1180 (which may also be referred to as a navigation module) that may perform one or more of the processes, methods, or steps described herein. The personal mobility vehicle interface modules 1172 may include a personal mobility vehicle data module 1166 and a personal mobility vehicle control module 1164. The navigation system 1180 may include a route module 1182 and a navigational feature module 1184. In some embodiments, the request module 1104, the personal mobility vehicle control module 1164, the personal mobility vehicle data module 1166, the route module 1182 and/or the navigational feature module 1184 may be configured using a single module or multiple modules.

The dynamic transportation matching system 1110 may receive a transportation request 1150 at the request module 1104 from a transportation requestor computing device 1156 of the transportation requestor 1102. The transportation requestor computing device 1156 may include a requestor application 1158. The requestor application 1158 may be an application, a program, and/or a module that may provide one or more services related to the providing of on-demand transportation and services that may include contacting a transportation service to request transportation and completing the transportation request and/or a trip using a personal mobility vehicle.

For example, a personal mobility vehicle (e.g. the PMV computing device 1134 of the personal mobility vehicle 1170) may provide personal mobility vehicle data to the personal mobility vehicle data module 1166. The personal mobility vehicle data module 1166 may provide the data to the personal mobility vehicle management module 1114 for use by the dynamic transportation matching system 1110. The personal mobility vehicle data can include information about the personal mobility vehicle 1170. The information can include, but is not limited to, a geographic location of the personal mobility vehicle 1170, the availability of the personal mobility vehicle 1170 (e.g., has it been reserved, is it functional (e.g., battery is charged)), etc.

The matching module 1118 included in the dynamic transportation matching modules 1112 may match the transportation requestor 1102 with the personal mobility vehicle 1170, as described herein, using information provided by the personal mobility vehicle management module 1114. The matching module 1118 may provide a match 1154 to the transportation requestor computing device 1156 that includes information about the personal mobility vehicle 1170 for use in completing a transportation request and/or a trip.

As shown in FIG. 11, the transportation requestor computing device 1156 may include a display device 1108 showing (displaying) a map 1110 with indications of locations of available personal mobility vehicles (e.g., personal mobility vehicle indicators 1106a-b). In the example shown in FIG. 11, the personal mobility vehicle indicator 1106a is associated with the personal mobility vehicle 1170. The map 1110 may show the personal mobility vehicle indicator 1106a highlighted in some manner to indicate to the requestor that the requestor has been matched with the personal mobility vehicle 1170.

Once the personal mobility vehicle 1170 is matched with the requestor 1102 for completion of travel for a trip, the transportation requestor computing device 1156 may provide trip information 1186 to the dynamic transportation matching system 1110. For example, the transportation requestor computing device 1156 may provide an address for a starting location and an ending location for the trip. The navigation system 1180 included in the dynamic transportation matching system 1110 may use the trip information 1186 to determine a route of travel of the personal mobility vehicle 1170 using the route module 1182. Once a route of travel for the trip is determined, the route module 1182 may provide the route information to a navigational feature module 1184. The navigational feature module 1184 may generate one or more navigational features (e.g., bounding areas) for the travel route as described herein. For example, the navigational feature module 1184 may identify one or more navigational junctions along the route of travel for the trip. The navigation system 1180 may use information and data regarding the personal mobility vehicle 1170 that the navigation system may receive from (request of) the personal mobility vehicle data module 1166. The navigational feature module 1184 may use the information and data related to the personal mobility vehicle 1170 to generate one or more bounding areas for the one or more junctions of the travel route.

For example, the navigational feature module 1184 may use a travel speed of the personal mobility vehicle 1170 to determine one or more sizes for bounding areas for the travel route. In some implementations, as described herein, the navigation system 1180 may provide each bounding area to the personal mobility vehicle control module 1164 to provide to the personal mobility vehicle computing device 1134 as the personal mobility vehicle 1170 navigates the travel route. In some implementations, the navigation system 1180 may provide all of the generated bounding areas for the route of travel to the personal mobility vehicle control module 1164 to provide to the personal mobility vehicle computing device 1134 prior to the personal mobility vehicle 1170 beginning travel.

A directional indication control application 1144 may control a directional indicator 1116 included in the PMV computing device 1134. The directional indicator 1116 may be controlled and operate as, for example, the directional indicator 406 as described herein. The directional indication control application 1144 may control the illumination of light-emitting devices that comprise the directional indicator 1116.

As discussed herein, the control of the illumination of the light-emitting devices included in the directional indicator 1116 may be based on ingress and egress points of bounding areas used to define the route of travel for the personal mobility vehicle 1170 using a current location and directional information of the personal mobility vehicle 1170. For example, once the requestor 1102 is matched with the personal mobility vehicle 1170, the route module 1182 may determine a route of travel for a trip. In some implementations, the personal mobility vehicle control module 1164 may communicate with the PMV computing device 1134 during the travel of the personal mobility vehicle 1170 along the route, providing navigation information in the form of bounding areas to the navigation application 1146, which also receives current location information for the personal mobility vehicle 1170 from the PMV peripheral devices 1120. In some implementations, the personal mobility vehicle control module 1164 may provide (download) the bounding areas for the entire route of travel to the PMV computing device 1134 for storage in memory.

Based on the received navigation information in the form of bounding areas and the current location information for the personal mobility vehicle 1170, the directional indication control application 1144 may determine the illumination of the light-emitting devices included in the directional indicator 1116 to direct (navigate) the personal mobility vehicle 1170 along the route, as described herein. For example, based on current location information for the personal mobility vehicle 1170 as determined by the location device 1122 and based on a current direction of travel of the personal mobility vehicle 1170 as determined by the directional device 1124, the navigation application 1146 may determine how travel of the personal mobility vehicle 1170 along the route should proceed based on a bounding area. The travel information may be provided to the directional indication control application 1144 which may then determine how to control the illumination of the light-emitting devices of the directional indicator 1116 to communicate directional information to the requestor 1102 as the requestor 1102 rides (uses) the personal mobility vehicle 1170 for travel along the route.

FIG. 12 is a block diagram of an example transportation management system 1200 that utilizes and controls personal mobility vehicles with mounted computing devices that include light-emitting devices that provide directional information based on navigation information and data included in bounding areas.

Referring at times to FIG. 11, the transportation management system 1200 may include a dynamic transportation matching system server 1262. The dynamic transportation matching system server 1262 may include a memory 1264 which may include one or more modules 1266, the personal mobility vehicle data module 1166, and a bounding area(s) storage module 1242. The bounding area(s) storage module 1242 may store one or more bounding areas generated by the navigational feature module 1184 for a trip.

The module(s) 1266 may include the dynamic transportation matching modules 1112, navigation system modules 1180, the request module 1104, and the personal mobility vehicle control module 1164. The dynamic transportation matching system server 1262 may include at least one physical processor 1260. In some implementations, the dynamic transportation matching system 1110 may be included as part of the dynamic transportation matching system server 1262.

The transportation management system 1200 may include the transportation requestor computing device 1156 that is communicatively coupled to the dynamic transportation matching system server 1262 by way of a network 1220. The transportation management system 1200 may include the personal mobility vehicle computing device 1134 that is communicatively coupled to the dynamic transportation matching system server 1262 by way of the network 1220.

The transportation requestor computing device 1156 includes a memory 1232 which may include one or more modules 1234. The module(s) 1234 may include the requestor application 1158. The transportation requestor computing device 1156 may include at least one physical processor 1230.

The personal mobility vehicle computing device 1134 includes a memory 1252 which may include one or more modules 1254. The module(s) 1254 may include the PMV application 1142, the directional indicator control application 1144, the navigation application 1146, and a bounding area(s) storage module 1244. The bounding area(s) storage module 1244 may store one or more bounding areas generated by the navigational feature module 1184 and received by the personal mobility vehicle computing device 1134 for a trip.

The personal mobility vehicle computing device 1134 may include at least one physical processor 1250.

As detailed above, the computing devices and systems described and/or illustrated herein broadly represent any type or form of computing device or system capable of executing computer-readable instructions, such as those contained within the modules and applications described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the applications and/or modules described herein. Examples of memory devices may include, but are not limited to, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory devices. In another example, a physical processor may execute computer-readable instructions included in one or more of the applications and/or modules stored in the above-described memory devices. Examples of physical processors may include, but are not limited to, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transportation requests to be transformed. One or more of the modules recited herein may transform the cancelled transportation request related data that may include information regarding external factors as well as progress information for a transportation provider. One or more of the modules recited herein may output a result of the transformation to create, update, and/or modify one or more data-driven models using machine learning. One or more of the modules recited herein may use the result of the transformation to identify a transportation requestor matched with a first transportation provider whose match is eligible for cancellation. One or more of the modules recited herein may use the result of the transformation to identify a second transportation provider for matching with the transportation requestor responsive to the cancellation of the matching of the transportation requestor with the first transportation provider. One or more of the modules recited herein may store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Figure 13:
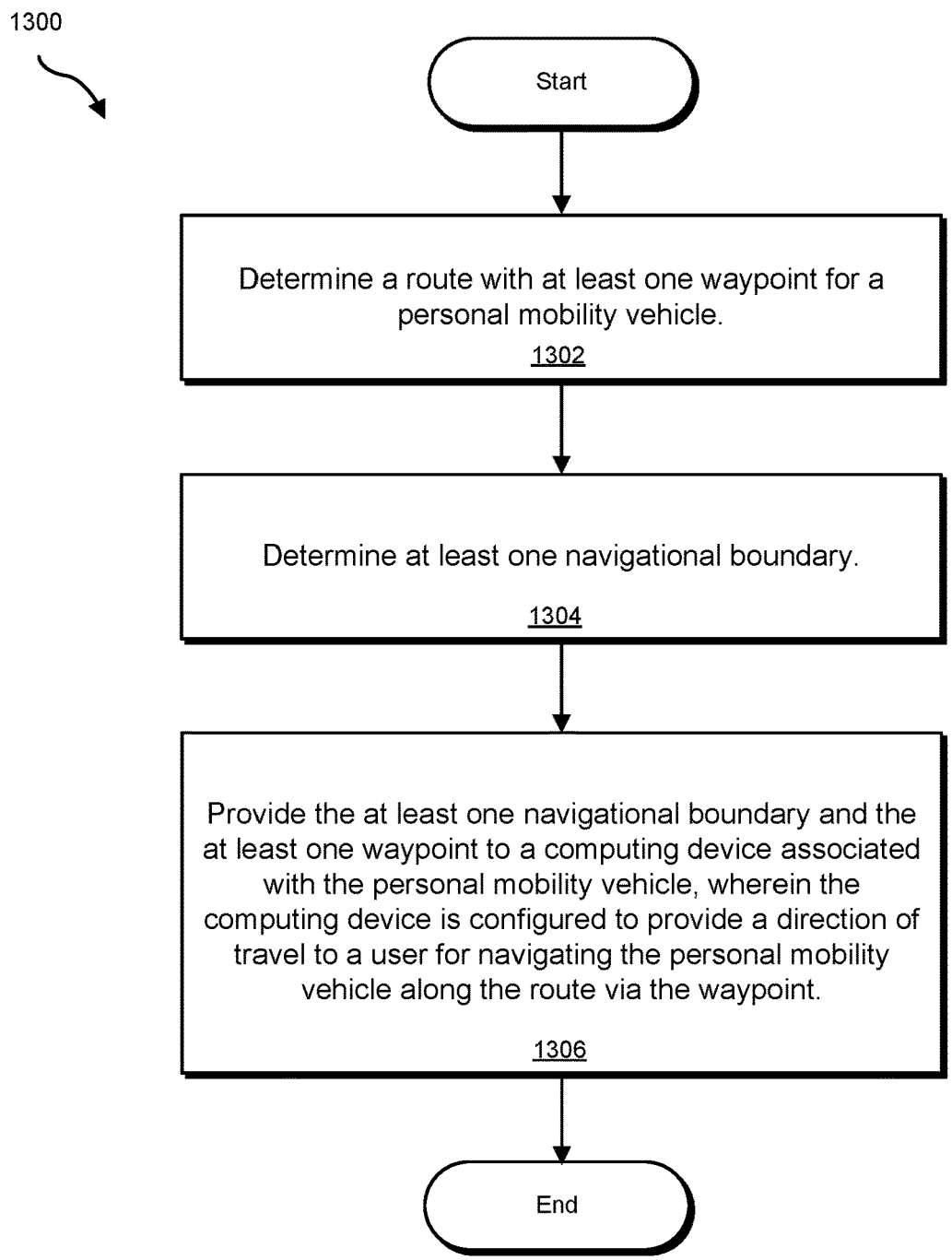
FIG. 13 is a flow diagram of an exemplary computer-implemented method for determining one or more navigational boundaries and one or more waypoints for a route of travel of a personal mobility vehicle.

FIG. 13 is a flow diagram of an exemplary computer-implemented method 1300 for determining (generating) one or more navigational boundaries and one or more waypoints for a route of travel of a personal mobility vehicle. The steps shown in FIG. 13 may be performed by any suitable computer-executable code and/or computing system, including the system(s) illustrated in FIG. 11 and FIG. 12. In one example, each of the steps shown in FIG. 13 may represent an algorithm whose structure includes and/or is represented by multiple sub-steps, examples of which will be provided in greater detail below.

As illustrated in FIG. 13, at step 1302 one or more of the systems described herein may determine a route with at least one waypoint for a personal mobility vehicle. For example, the route module 1182 may determine a route of travel for a trip using a personal mobility vehicle that includes at least one waypoint.

The systems described herein may perform step 1302 in a variety of ways. In one example, the route module 1182 may receive the trip information 1186 from the transportation requestor computing device 1156. The route module 1182 may determine a route of travel for the trip based on the trip information 1186. The route of travel for the trip may use the personal mobility vehicle 1170 for travel from a starting location (e.g., the starting location 150) to an ending location (e.g., the ending location 152) and may include one or more waypoints along the way.

At step 1304 one or more of the systems described herein may determine at least one navigational boundary. For example, the navigational feature module 1184 may identify one or more navigational boundaries (one or more navigational junctions) along the route of travel for the trip.

The systems described herein may perform step 1304 in a variety of ways. In one example, the route module 1182 may provide the determined route of travel for the trip to the navigational feature module 1184. The navigational feature module 1184 may identify at least one navigational boundary along the route of travel received from the route module 1182.

At step 1306 one or more of the systems described herein may provide the at least one navigational boundary and the at least one waypoint to a computing device associated with the personal mobility vehicle. The computing device may be configured to provide a direction of travel to a user for navigating the personal mobility vehicle along the route via the waypoint. For example, the personal mobility vehicle control module 1164 may provide the at least one navigational boundary and the at least one waypoint to the personal mobility vehicle computing device 1134. The personal mobility vehicle computing device 1134 may control the directional indicator 1116, as disclosed herein, to provide a direction of travel to a user for navigating the personal mobility vehicle along the route via the waypoint.

The systems described herein may perform step 1306 in a variety of ways. In one example, the dynamic transportation matching system 1110 may provide the at least one navigational boundary and the at least one waypoint to the personal mobility vehicle computing device 1134 for use by the navigation application 1146 and the directional indicator control application 1144 to provide control of the directional indicator 1116 of the personal mobility vehicle 1170. The light-emitting devices included in the directional indicator 1116 may be illuminated as described herein to provide directional information to the requestor 1102 as the requestor 1102 navigates the personal mobility vehicle 1170 along the route via the waypoint.

A computer-implemented method may include determining a route with at least one waypoint for a personal mobility vehicle, determining at least one navigational boundary, and providing the at least one navigational boundary and the at least one waypoint to a computing device associated with the personal mobility vehicle, wherein the computing device is configured to provide a direction of travel to a user for navigating the personal mobility vehicle along the route via the waypoint.

In some examples, the computing device may be configured to provide the direction of travel to the user may be in response to the personal mobility vehicle entering the navigational boundary.

In some examples, before providing the at least one navigational boundary and the at least one waypoint to the computing device, a time of arrival of the personal mobility vehicle to the navigational boundary may be determined based on a speed of travel of the personal mobility vehicle towards the navigational boundary.

In some examples, the navigational boundary and the waypoint may be provided to the computing device before the time of arrival of the personal mobility vehicle to the navigational boundary.

In some examples, providing the navigational boundary and the waypoint to the computing device before the time of arrival of the personal mobility vehicle to the navigational boundary may allow the user to navigate the personal mobility vehicle towards the waypoint.

In some examples, before providing the at least one navigational boundary and the at least one waypoint to the computing device associated with the personal mobility vehicle, a location of the personal mobility vehicle that is at a threshold distance from the navigational boundary may be determined.

In some examples, determining at least one navigational boundary may include determining a first navigational boundary associated with a first waypoint along the route.

In some examples, the first navigational boundary may be at a first point along the route before the first waypoint.

In some examples, determining at least one navigational boundary may include determining a second navigational boundary associated with a second waypoint along the route.

In some examples, the second navigational boundary may be at a second point along the route before the second waypoint.

In some examples, the second waypoint may be further along the route than the first waypoint.

In some examples, providing the at least one navigational boundary and the at least one waypoint to the computing device coupled to the personal mobility vehicle may include providing the first navigational boundary and the first waypoint to the computing device coupled to the personal mobility vehicle.

In some examples, the computing device may be configured to provide a first direction of travel to the user for navigating the personal mobility vehicle along the route via the first waypoint.

In some examples, subsequent to the personal mobility vehicle arriving at the first waypoint, the second navigational boundary and the second waypoint may be provided to the computing device coupled to the personal mobility vehicle.

In some examples, the computing device may be configured to provide a second direction of travel to the user for navigating the personal mobility vehicle along the route via the second waypoint.

In some examples, providing the at least one navigational boundary and the at least one waypoint to the computing device coupled to the personal mobility vehicle may include providing the navigational boundary before a start of travel of the personal mobility vehicle.

In some examples, the computing device may be configured to store the navigational boundary for use after a start of travel of the personal mobility vehicle along the route.

In some examples, the at least one navigational boundary may define a bounding area.

In some examples, the computing may be configured to provide a direction of travel towards the at least one waypoint from a location of the personal mobility vehicle in response to the personal mobility vehicle entering the bounding area.

In some examples, the waypoint may be an egress point from the bounding area.

In some examples, the personal mobility vehicle may be a two-wheeled vehicle.

A corresponding system may include a route module, stored in memory, that determines a route with at least one waypoint for a personal mobility vehicle, a navigational feature module, stored in memory, that determines at least one navigational boundary, a personal mobility vehicle control module, stored in memory, that provides the at least one navigational boundary and the at least one waypoint to a computing device associated with the personal mobility vehicle, wherein the computing device is configured to provide a direction of travel to a user for navigating the personal mobility vehicle along the route via the waypoint, and at least one physical processor that executes the route module, the navigational feature module, and the personal mobility vehicle control module.

A corresponding non-transitory computer-readable storage medium may include computer-readable instructions that, when executed by at least one processor of a computing system, cause the computing system to determine a route with at least one waypoint for a personal mobility vehicle, determine at least one navigational boundary, and provide the at least one navigational boundary and the at least one waypoint to a computing device associated with the personal mobility vehicle, wherein the computing device is configured to provide a direction of travel to a user for navigating the personal mobility vehicle along the route via the waypoint.

Figure 14:
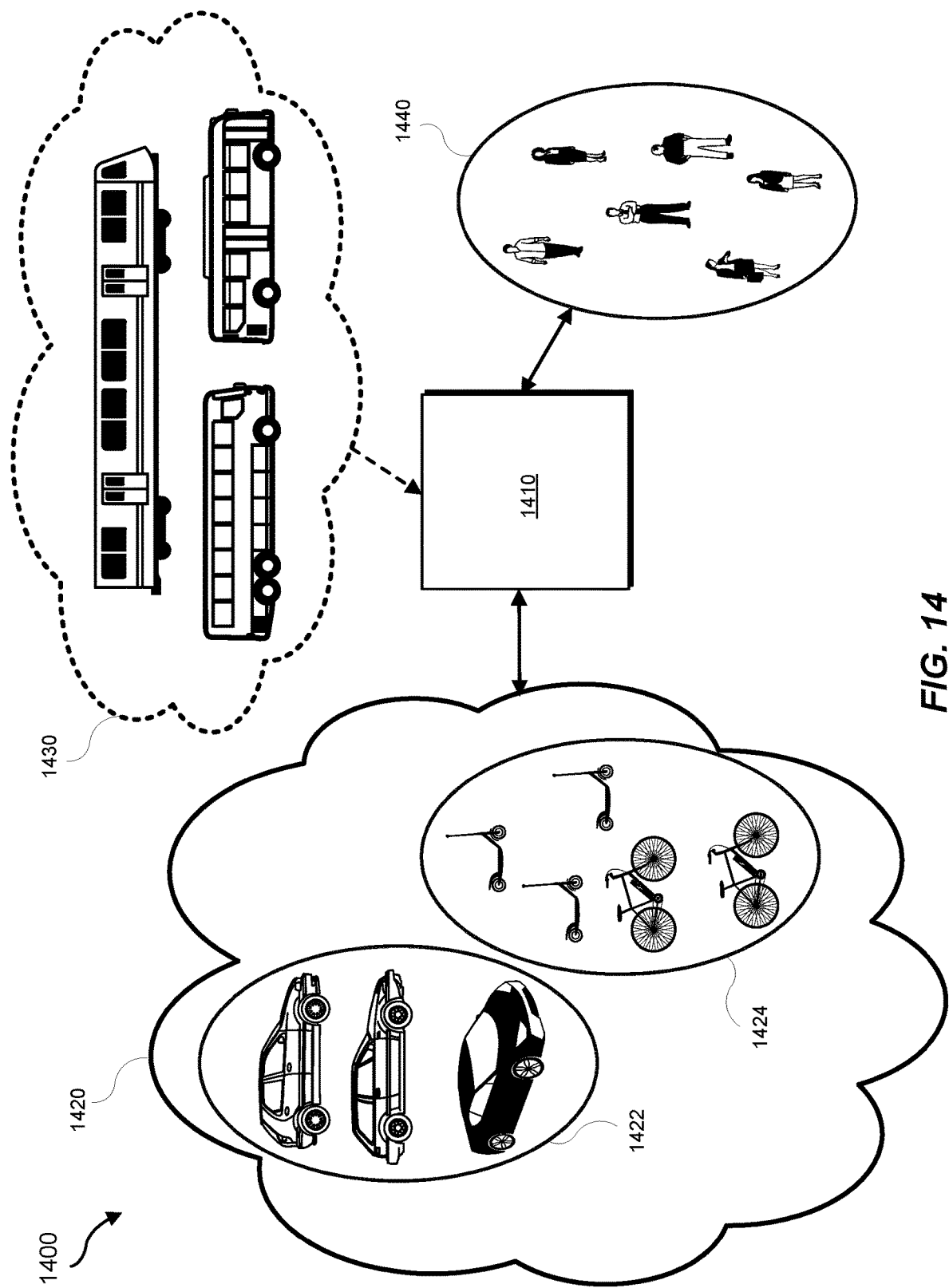
FIG. 14 is an illustration of an example system for providing dynamic transportation with a dynamic transportation network that includes personal mobility vehicles.

FIG. 14 is an illustration of an example system 1400 for providing dynamic transportation with a dynamic transportation network that includes personal mobility vehicles. As shown in FIG. 14, vehicles 1420 may include lane-constrained vehicles 1422 (e.g., automobiles and/or cars) as well as personal mobility vehicles 1424 (e.g., electronic scooters (referred to also as scooters) and electronic bicycles (referred to also as bicycles)). For example, the personal mobility vehicles 1424 may also include any motorized device (e.g., electric, gas, propane, diesel, human-powered, etc.) that includes a computing device that may be mounted on the personal mobility vehicle.

The personal mobility vehicles 1424 may include any type of two-wheeled vehicles such as scooters (e.g., electronic scooters, motorized scooters, classic scooters) and bicycles (e.g., electronic bicycles, classic bicycles). A personal mobility vehicle may be an electrically-assisted two-wheeled vehicles that may include, but is not limited to, an electric bicycle (or "e-bike") and an electric scooter (or "e-scooter"). An electric scooter may be electrically powered wholly or partly. In some examples, an electrically-assisted scooter may include a built-in battery-powered motor that may be used to assist a rider of the scooter. An electric bicycle may be electrically powered wholly or partly. In some examples, an electrically-assisted bicycle may include a built-in battery powered motor that may be used to assist the pedal power of a rider. A classic bicycle (a classic bike) may be a pedal-powered only bicycle.

The computing device may be used for management and interaction with the dynamic transportation network. A lane-constrained vehicle may be operated by a driver and a transportation requestor may be a passenger in the lane-constrained vehicle. In some implementations, the driver may be a person. In some implementations, a lane-constrained vehicle may be an autonomous vehicle. The transportation requestor may operate a personal mobility vehicle.

The vehicles 1420 may operate as part of a dynamic transportation network managed by a dynamic transportation matching system 1410. Thus, the dynamic transportation matching system 1410 may be in communication with the vehicles 1420 (and/or provider devices associated with the vehicles 1420) to receive information relevant to making transportation matches (e.g., location information, availability information, etc.) as well as to provide matching instructions once transportation matches have been made.

In addition to the vehicles 1420, in some examples, the dynamic transportation matching system 1410 may also be in communication with vehicles 1430. In some examples, vehicles 1430 may not operate as a part of the dynamic transportation network. For example, the dynamic transportation matching system 1410 may not manage or direct the vehicles 1430. Instead, the vehicles 1430 may provide predictable and/or reliable transportation upon which the dynamic transportation matching system 1410 may rely when making matches. For example, the vehicles 1430 may include buses, subways, trains, and the like that may (i) run on fixed schedules known to the dynamic transportation matching system 1410 and/or (ii) make available information to the dynamic transportation matching system 1410 allowing the dynamic transportation matching system 1410 to predict departure and arrival times. While the dynamic transportation matching system 1410 may not manage or control the vehicles 1430, in some examples, the dynamic transportation matching system 1410 may interact with systems that may manage transportation provided by the vehicles 1430. For example, the dynamic transportation matching system 1410 may procure tickets to ride one or more of the vehicles 1430 on behalf of one or more of requestors 1440 and/or may notify one or more of the vehicles 1430 of the status of one or more of the requestors 1440. When the dynamic transportation matching system 1410 receives transportation requests from one or more of the requestors 1440, the dynamic transportation matching system 1410 may match the transportation request with one or more providers among the vehicles 1420 and/or the vehicles 1430 based on any of a variety of factors.

For example, the dynamic transportation matching system 1410 may match the transportation request based on the current and/or projected location of and/or the current and/or projected availability of each candidate provider. In some examples, the dynamic transportation matching system 1410 may match the transportation requestor to a first provider instead of a second provider in order to maintain availability of the second provider for another current or prospective requestor. In some examples, the dynamic transportation matching system 1410 may match the transportation requestor based on a suitability of a candidate provider for completing the transportation request. For example, the dynamic transportation matching system 1410 may determine that a long-distance trip is suited for a lane-constrained vehicle but may determine that a relatively short trip is suited for a personal mobility vehicle. In some examples, the dynamic transportation matching system 1410 may match a transportation requestor to multiple providers. For example, the dynamic transportation matching system 1410 may match a lane-constrained vehicle to one leg of a trip, a mass transit vehicle to another leg of the trip, and a personal mobility vehicle to a third leg of the trip.

Figure 15:
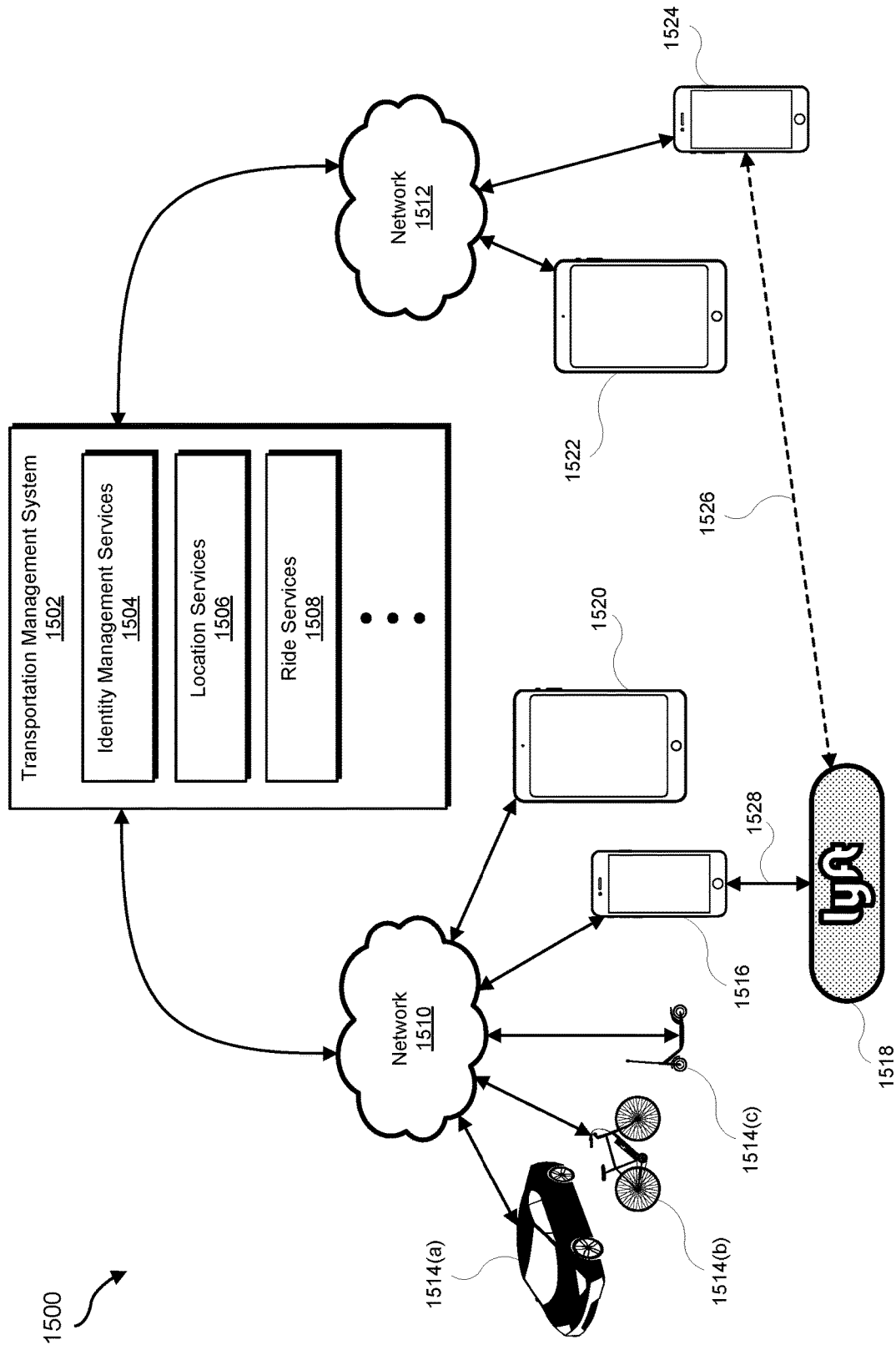
FIG. 15 shows a transportation management environment in accordance with various embodiments.

FIG. 15 shows a transportation management environment 1500 in accordance with various embodiments. As shown in FIG. 15, a transportation management system 1502 may run one or more services and/or software applications, including identity management services 1504, location services 1506, ride services 1508, and/or other services. Although FIG. 15 shows a certain number of services provided by transportation management system 1502, more or fewer services may be provided in various implementations. In addition, although FIG. 15 shows these services as being provided by transportation management system 1502, all or a portion of any of the services may be processed in a distributed fashion. For example, computations associated with a service task may be performed by a combination of transportation management system 1502 (including any number of servers, databases, etc.), one or more devices associated with a provider (e.g., devices integrated with managed vehicles 1514(*a*), 1514(*b*), and/or 1514(*c*), provider computing devices 1516 and tablets 1520, and transportation management vehicle devices 1518), and/or more or more devices associated with a ride requestor (e.g., the computing devices of the requestor 1524 and tablets 1522). In some embodiments, transportation management system 1502 may include one or more general purpose computers, server computers, clustered computing systems, cloud-based computing systems, and/or any other computing systems or arrangements of computing systems. Transportation management system 1502 may be configured to run any or all of the services and/or software components described herein. In some embodiments, the transportation management system 1502 may include an appropriate operating system and/or various server applications, such as web servers capable of handling hypertext transport protocol (HTTP) requests, file transfer protocol (FTP) servers, database servers, etc.

In some embodiments, identity management services 1504 may be configured to perform authorization services for requestors and providers and/or manage their interactions and/or data with transportation management system 1502. This may include, e.g., authenticating the identity of providers and determining that they are authorized to provide services through transportation management system 1502. Similarly, requestors' identities may be authenticated to determine whether they are authorized to receive the requested services through transportation management system 1502. Identity management services 1504 may also manage and/or control access to provider and/or requestor data maintained by transportation management system 1502, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1502 may also manage and/or control access to provider and/or requestor data stored with and/or obtained from third-party systems. For example, a requester or provider may grant transportation management system 1502 access to a third-party email, calendar, or task management system (e.g., via the credentials of the user). As another example, a requestor or provider may grant, through a mobile device (e.g., 1516, 1520, 1522, or 1524), a transportation application associated with transportation management system 1502 access to data provided by other applications installed on the mobile device. In some examples, such data may be processed on the client and/or uploaded to transportation management system 1502 for processing.

In some embodiments, transportation management system 1502 may provide ride services 1508, which may include ride matching and/or management services to connect a requestor to a provider. For example, after identity management services module 1504 has authenticated the identity a ride requestor, ride services module 1508 may attempt to match the requestor with one or more ride providers. In some embodiments, ride services module 1508 may identify an appropriate provider using location data obtained from location services module 1506. Ride services module 1508 may use the location data to identify providers who are geographically close to the requestor (e.g., within a certain threshold distance or travel time) and/or who are otherwise a good match with the requestor. Ride services module 1508 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1508 may use rule-based algorithms and/or machine-learning models for matching requestors and providers.

Transportation management system 1502 may communicatively connect to various devices through networks 1510 and/or 1512. Networks 1510 and 1512 may include any combination of interconnected networks configured to send and/or receive data communications using various communication protocols and transmission technologies. In some embodiments, networks 1510 and/or 1512 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1510 and/or 1512 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1510 and/or 1512 may include any combination of networks described herein or any other type of network capable of facilitating communication across networks 1510 and/or 1512.

In some embodiments, transportation management vehicle device 1518 may include a provider communication device configured to communicate with users, such as drivers, passengers, pedestrians, and/or other users. In some embodiments, transportation management vehicle device 1518 may communicate directly with transportation management system 1502 or through another provider computing device, such as provider computing device 1516. In some embodiments, a requestor computing device (e.g., device 1524) may communicate via a connection 1526 directly with transportation management vehicle device 1518 via a communication channel and/or connection, such as a peer-to-peer connection, Bluetooth connection, NFC connection, ad hoc wireless network, and/or any other communication channel or connection. Although FIG. 15 shows particular devices communicating with transportation management system 1502 over networks 1510 and 1512, in various embodiments, transportation management system 1502 may expose an interface, such as an application programming interface (API) or service provider interface (SPI) to enable various third parties which may serve as an intermediary between end users and transportation management system 1502.

In some embodiments, devices within a vehicle may be interconnected. For example, any combination of the following may be communicatively connected: vehicle 1514(*a*), vehicle 1514(*b*), vehicle 1514(*c*), provider computing device 1516, provider tablet 1520, transportation management vehicle device 1518, requestor computing device 1524, requestor tablet 1522, and any other device (e.g., smart watch, smart tags, etc.). For example, transportation management vehicle device 1518 may be communicatively connected to provider computing device 1516 and/or requestor computing device 1524. Transportation management vehicle device 1518 may establish communicative connections, such as connections 1526 and 1528, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1502 using applications executing on their respective computing devices (e.g., 1516, 1518, 1520, and/or a computing device integrated within vehicle 1514(*a*), vehicle 1514(*b*), and/or vehicle 1514(*c*)), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1514(*a*), vehicle 1514(*b*), and/or vehicle 1514(*c*) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1502. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 16:
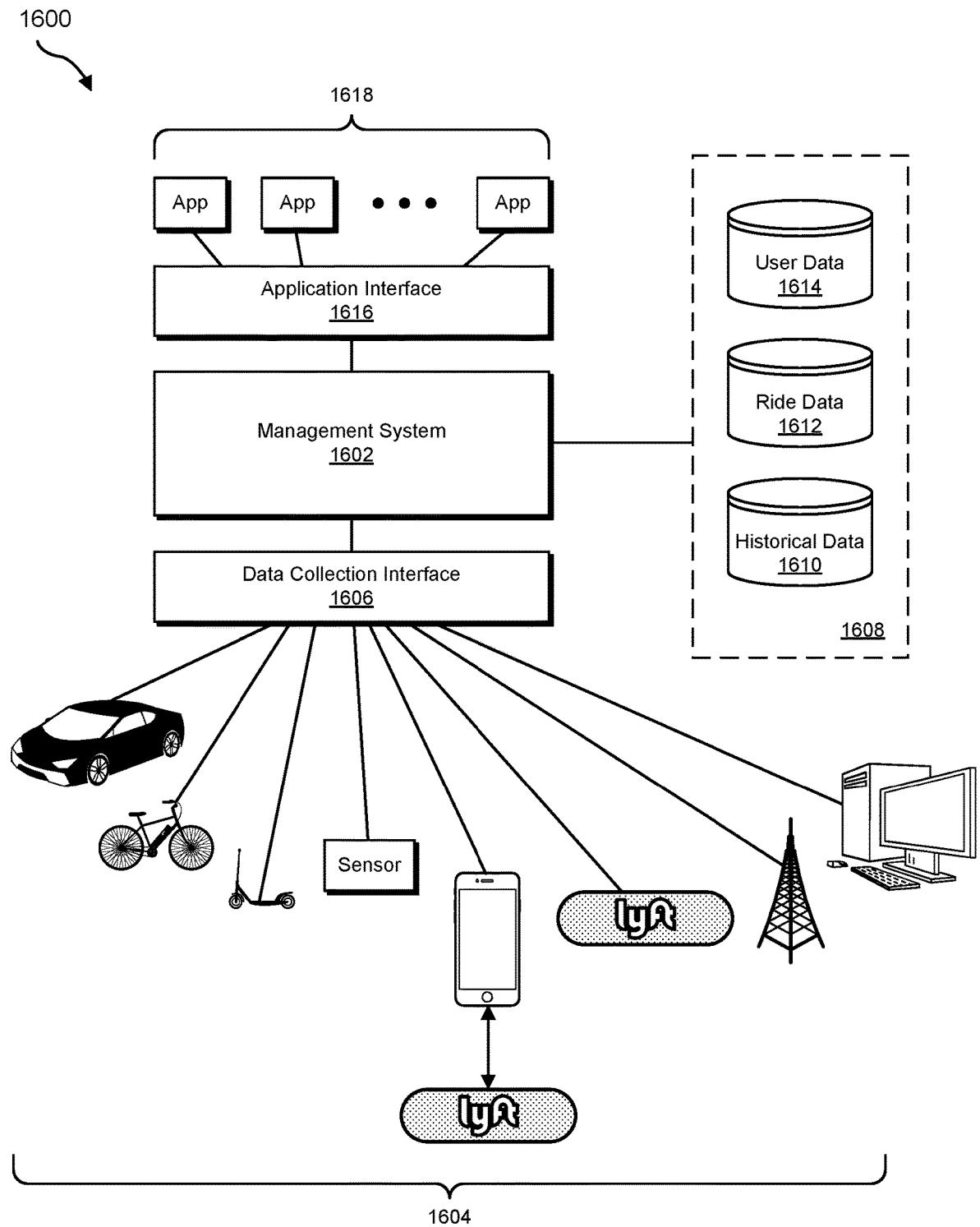
FIG. 16 shows a data collection and application management environment in accordance with various embodiments.

FIG. 16 shows a data collection and application management environment 1600 in accordance with various embodiments. As shown in FIG. 16, management system 1602 may be configured to collect data from various data collection devices 1604 through a data collection interface 1606. As discussed above, management system 1602 may include one or more computers and/or servers or any combination thereof. Data collection devices 1604 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1606 can include, e.g., an extensible device framework configured to support interfaces for each data collection device. In various embodiments, data collection interface 1606 may be extended to support new data collection devices as they are released and/or to update existing interfaces to support changes to existing data collection devices. In various embodiments, data collection devices may communicate with data collection interface 1606 over one or more networks. The networks may include any network or communication protocol as would be recognized by one of ordinary skill in the art, including those networks discussed above.

As shown in FIG. 16, data received from data collection devices 1604 can be stored in data store 1608. Data store 1608 may include one or more data stores, such as databases, object storage systems and services, cloud-based storage services, and other data stores. For example, various data stores may be implemented on a non-transitory storage medium accessible to management system 1602, such as historical data store 1610, ride data store 1612, and user data store 1614. Data stores 1608 can be local to management system 1602, or remote and accessible over a network, such as those networks discussed above or a storage-area network or other networked storage system. In various embodiments, historical data 1610 may include historical traffic data, weather data, request data, road condition data, or any other data for a given region or regions received from various data collection devices. Ride data 1612 may include route data, request data, timing data, and other ride related data, in aggregate and/or by requestor or provider. User data 1614 may include user account data, preferences, location history, and other user-specific data. Although certain data stores are shown by way of example, any data collected and/or stored according to the various embodiments described herein may be stored in data stores 1608.

As shown in FIG. 16, an application interface 1616 can be provided by management system 1602 to enable various apps 1618 to access data and/or services available through management system 1602. Apps 1618 may run on various user devices (including provider and requestor computing devices, such as those discussed above) and/or may include cloud-based or other distributed apps configured to run across various devices (e.g., computers, servers, or combinations thereof). Apps 1618 may include, e.g., aggregation and/or reporting apps which may utilize data 1608 to provide various services (e.g., third-party ride request and management apps). In various embodiments, application interface 1616 can include an API and/or SPI enabling third party development of apps 1618. In some embodiments, application interface 1616 may include a web interface, enabling web-based access to data 1608 and/or services provided by management system 1602. In various embodiments, apps 1618 may run on devices configured to communicate with application interface 1616 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining a route for a personal mobility vehicle;
   generating a navigational boundary for a portion of the route, wherein the portion of the route comprises a junction of two or more roads;
   identifying an ingress on the navigational boundary;
   identifying an egress on the navigational boundary;
   determining one or more intermediate locations along the two or more roads that form a sub-route in the navigational boundary between the ingress on the navigational boundary and the egress on the navigational boundary; and
   providing the navigational boundary, the ingress, the egress, and the one or more intermediate locations to a computing device associated with the personal mobility vehicle, wherein the computing device is configured to illuminate a sequence of light patterns to indicate a direction of travel to a user for navigating the personal mobility vehicle along the sub-route between the ingress of the navigational boundary and the egress of the navigational boundary;
   wherein the providing the navigational boundary, the ingress, the egress, and the one or more intermediate locations to the computing device causes the computing device to illuminate the sequence of light patterns as the personal mobility vehicle travels along the sub-route; and
   wherein one or more light patterns of the sequence of light patterns corresponds to the direction of travel to a next intermediate location along the sub-route and is illuminated as the personal mobility vehicle reaches a previous intermediate location along the sub-route.

2. The computer-implemented method of claim 1, wherein the computing device is configured to illuminate the sequence of light patterns in response to the personal mobility vehicle entering the navigational boundary through the ingress.

3. The computer-implemented method of claim 1, further comprising before providing the navigational boundary, the ingress, the egress, and the one or more intermediate locations to the computing device, determining a time of arrival of the personal mobility vehicle to the navigational boundary based on a speed of travel of the personal mobility vehicle towards the navigational boundary, wherein the navigational boundary, the ingress, the egress, and the one or more intermediate locations are provided to the computing device before the time of arrival of the personal mobility vehicle to the navigational boundary.

4. The computer-implemented method of claim 3, wherein providing the navigational boundary, the ingress, the egress, and the one or more intermediate locations to the computing device before the time of arrival of the personal mobility vehicle to the navigational boundary allows the user to navigate the personal mobility vehicle through the navigational boundary.

5. The computer-implemented method of claim 1, further comprising before providing the navigational boundary, the ingress, the egress, and the one or more intermediate locations to the computing device associated with the personal mobility vehicle, determining that a location of the personal mobility vehicle is at a threshold distance from the navigational boundary.

6. The computer-implemented method of claim 1, wherein generating the navigational boundary for the portion of the route comprises:
   generating a first navigational boundary for a first portion of the route;
   identifying a first ingress and a first egress on the first navigational boundary;
   generating a second navigational boundary for a second portion of the route;
   identifying a second ingress and a second egress on the second navigational boundary; and
   wherein the second navigational boundary is further along the route than the first navigational boundary.

7. The computer-implemented method of claim 6, further comprising:
   providing the first navigational boundary, the first ingress, and the first egress to the computing device, wherein the computing device is configured to illuminate the one or more light patterns for navigating the personal mobility vehicle along the first portion of the route; and
   providing the second navigational boundary, the second ingress, and the second egress to the computing device, wherein the computing device is configured to illuminate the one or more light patterns for navigating the personal mobility vehicle along the second portion of the route.

8. The computer-implemented method of claim 1, wherein:
   the providing the navigational boundary, the ingress, the egress, and the one or more intermediate locations to the computing device is performed before a start of travel of the personal mobility vehicle; and
   the computing device is configured to store the navigational boundary for use after the start of travel of the personal mobility vehicle along the route.

9. The computer-implemented method of claim 1, wherein:
   the navigational boundary defines a bounding area; and
   the computing device is configured to illuminate the sequence of light patterns to indicate the direction of travel in response to the personal mobility vehicle entering the bounding area.

10. The computer-implemented method of claim 1, wherein the personal mobility vehicle is a two-wheeled vehicle.

11. A system comprising:
    a route module, stored in memory, that determines a route for a personal mobility vehicle;
    a navigational feature module, stored in memory, that generates a navigational boundary for a portion of the route and that identifies an ingress and an egress on the navigational boundary, and one or more intermediate locations along two or more roads that form a sub-route in the navigational boundary between the ingress and the egress;
    a personal mobility vehicle control module, stored in memory, that provides the navigational boundary, the ingress, the egress, and the one or more intermediate locations to a computing device associated with the personal mobility vehicle, wherein the computing device is configured to illuminate a sequence of light patterns to indicate a direction of travel to a user for navigating the personal mobility vehicle along the sub-route between the ingress of the navigational boundary and the egress of the navigational boundary;

wherein the providing the navigational boundary, the ingress, the egress, and the one or more intermediate locations to the computing device causes the computing device to illuminate the sequence of light patterns as the personal mobility vehicle travels along the sub-route; and wherein one or more light patterns of the sequence of light patterns corresponds to the direction of travel to a next intermediate location along the sub-route and is illuminated as the personal mobility vehicle reaches a previous intermediate location along the sub-route; and at least one physical processor that executes the route module, the navigational feature module, and the personal mobility vehicle control module.

12. The system of claim 11, wherein the computing device is configured to illuminate the sequence of light patterns in response to the personal mobility vehicle entering the navigational boundary through the ingress.

13. The system of claim 11, further comprising a personal mobility vehicle data module, stored in memory, that determines, before the personal mobility vehicle control module provides the navigational boundary, the ingress, the egress and the one or more intermediate locations to the computing device, a time of arrival of the personal mobility vehicle to the navigational boundary based on a speed of travel of the personal mobility vehicle towards the navigational boundary, wherein the personal mobility vehicle control module provides the navigational boundary, the ingress, the egress, and the one or more intermediate locations to the computing device before the time of arrival of the personal mobility vehicle to the navigational boundary.

14. The system of claim 13, wherein the personal mobility vehicle control module provides the navigational boundary, the ingress, the egress, and the one or more intermediate locations to the computing device before the time of arrival of the personal mobility vehicle to the navigational boundary allowing the user to navigate the personal mobility vehicle through the navigational boundary.

15. The system of claim 11, further comprising a personal mobility vehicle data module, stored in memory, that determines, before the personal mobility vehicle control module provides the navigational boundary, the ingress, the egress, and the one or more intermediate locations to the computing device associated with the personal mobility vehicle, that a location of the personal mobility vehicle is at a threshold distance from the navigational boundary.

16. The system of claim 11, wherein generating the navigational boundary for the portion of the route comprises:
generating a first navigational boundary for a first portion of the route;
identifying a first ingress and a first egress on the first navigational boundary;
generating a second navigational boundary for a second portion of the route; and
identifying a second ingress and a second egress on the second navigational boundary wherein the second navigational boundary is further along the route than the first navigational boundary.

17. The system of claim 16, wherein the personal mobility vehicle control module is configured to:
provide the first navigational boundary, the first ingress, and the first egress to the computing device, wherein the computing device is configured to illuminate the one or more light patterns for navigating the personal mobility vehicle along the first portion of the route; and
provide the second navigational boundary, the second ingress, and the second egress to the computing device, wherein the computing device is configured to illuminate the one or more light patterns for navigating the personal mobility vehicle along the second portion of the route.

18. The system of claim 11, wherein:
the providing the navigational boundary, the ingress, the egress, and the one or more intermediate locations to the computing device is performed before a start of travel of the personal mobility vehicle; and
the computing device is configured to store the navigational boundary for use after the start of travel of the personal mobility vehicle along the route.

19. The system of claim 11, wherein:
the navigational boundary defines a bounding area; and
the computing device is configured to illuminate the sequence of light patterns to indicate the direction of travel in response to the personal mobility vehicle entering the bounding area.

20. A computer-readable medium comprising computer-readable instructions that, when executed by at least one processor of a computing system, cause the computing system to:
determine a route for a personal mobility vehicle;
generate a navigational boundary for a portion of the route, wherein the portion of the route comprises a junction of two or more roads;
identify an ingress and an egress on the navigational boundary;
determine one or more intermediate locations along the two or more roads that form a sub-route in the navigational boundary between the ingress on the navigational boundary and the egress on the navigational boundary; and
provide the navigational boundary, the ingress, the egress, and the one or more intermediate locations to a computing device associated with the personal mobility vehicle, wherein the computing device is configured to illuminate a sequence of light patterns to indicate a direction of travel to a user for navigating the personal mobility vehicle along of the sub-route between the ingress of the navigational boundary and the egress of the navigational boundary;
wherein the providing the navigational boundary, the ingress, the egress, and the one or more intermediate locations to the computing device causes the computing device to illuminate the sequence of light patterns as the personal mobility vehicle travels along the sub-route; and
wherein one or more light patterns of the sequence of light patterns corresponds to the direction of travel to a next intermediate location along the sub-route and is illuminated as the personal mobility vehicle reaches a previous intermediate location along the sub-route.

* * * * *